United States Patent
Lazzari et al.

(10) Patent No.: US 12,551,306 B2
(45) Date of Patent: Feb. 17, 2026

(54) ARTICULATED SURGICAL INSTRUMENT FOR ROBOTIC SURGERY OR MICROSURGERY, MANUFACTURING METHOD AND ASSEMBLY METHOD

(71) Applicant: Medical Microinstruments, Inc., Wilmington, DE (US)

(72) Inventors: Giorgio Lazzari, Pisa (IT); Massimiliano Simi, Pisa (IT)

(73) Assignee: MEDICAL MICROINSTRUMENTS, INC., Wilmington, DE (US)

( * ) Notice: Subject to any disclaimer, the term of this patent is extended or adjusted under 35 U.S.C. 154(b) by 211 days.

(21) Appl. No.: 18/352,110

(22) Filed: Jul. 13, 2023

(65) Prior Publication Data

US 2024/0016566 A1    Jan. 18, 2024

(30) Foreign Application Priority Data

Jul. 14, 2022    (IT) .......................... 102022000014779

(51) Int. Cl.
*A61B 34/00* (2016.01)
*A61B 34/30* (2016.01)

(52) U.S. Cl.
CPC .............. *A61B 34/71* (2016.02); *A61B 34/30* (2016.02); *A61B 34/72* (2016.02)

(58) Field of Classification Search
CPC ......... A61B 34/71; A61B 34/30; A61B 34/72; A61B 2017/003; A61B 2017/00526; A61B 2017/2926; A61B 2017/2932; A61B 2017/2939; A61B 2034/305; A61B 17/29
See application file for complete search history.

(56) References Cited

U.S. PATENT DOCUMENTS

| | | |
|---|---|---|
| 9,186,221 B2 | 11/2015 | Burbank |
| 10,582,975 B2 | 3/2020 | Simi et al. |
| 2018/0250085 A1 | 9/2018 | Simi et al. |
| 2020/0390430 A1 | 12/2020 | Ratia et al. |
| 2020/0405423 A1 | 12/2020 | Schuh |

(Continued)

FOREIGN PATENT DOCUMENTS

| | | |
|---|---|---|
| EP | 3362218 B1 | 10/2019 |
| EP | 3597340 A1 | 1/2020 |
| WO | 2017064303 A1 | 4/2017 |

(Continued)

OTHER PUBLICATIONS

Search Report for Italian Patent Application No. 202200014779, mailed Mar. 1, 2023, 6 pgs.

*Primary Examiner* — Brooke Labranche
(74) *Attorney, Agent, or Firm* — Merchant & Gould P.C.

(57) ABSTRACT

A surgical instrument includes an articulated end having a first support link, a second link articulated with respect to the first support link about a rotation axis, and a transmission cable fixed to the second link. The first support link has at least one first convex ruled surface with straight generator lines all parallel to each other, and a second convex ruled surface with straight generator lines all parallel to each other. The transmission cable is configured to slide on both the at least one first convex ruled surface and the second convex ruled surface of the first support link when the second link rotates with respect to the first support link. The straight generator lines of the at least one first convex ruled surface are orthogonal to the straight generator lines of the second convex ruled surface.

19 Claims, 17 Drawing Sheets

(56) References Cited

U.S. PATENT DOCUMENTS

2021/0106393 A1 4/2021 Simi et al.
2021/0121259 A1 4/2021 Simi et al.

FOREIGN PATENT DOCUMENTS

| WO | 2017064305 A1 | 4/2017 |
| WO | 2017098279 A1 | 6/2017 |
| WO | 2018189722 A1 | 10/2018 |

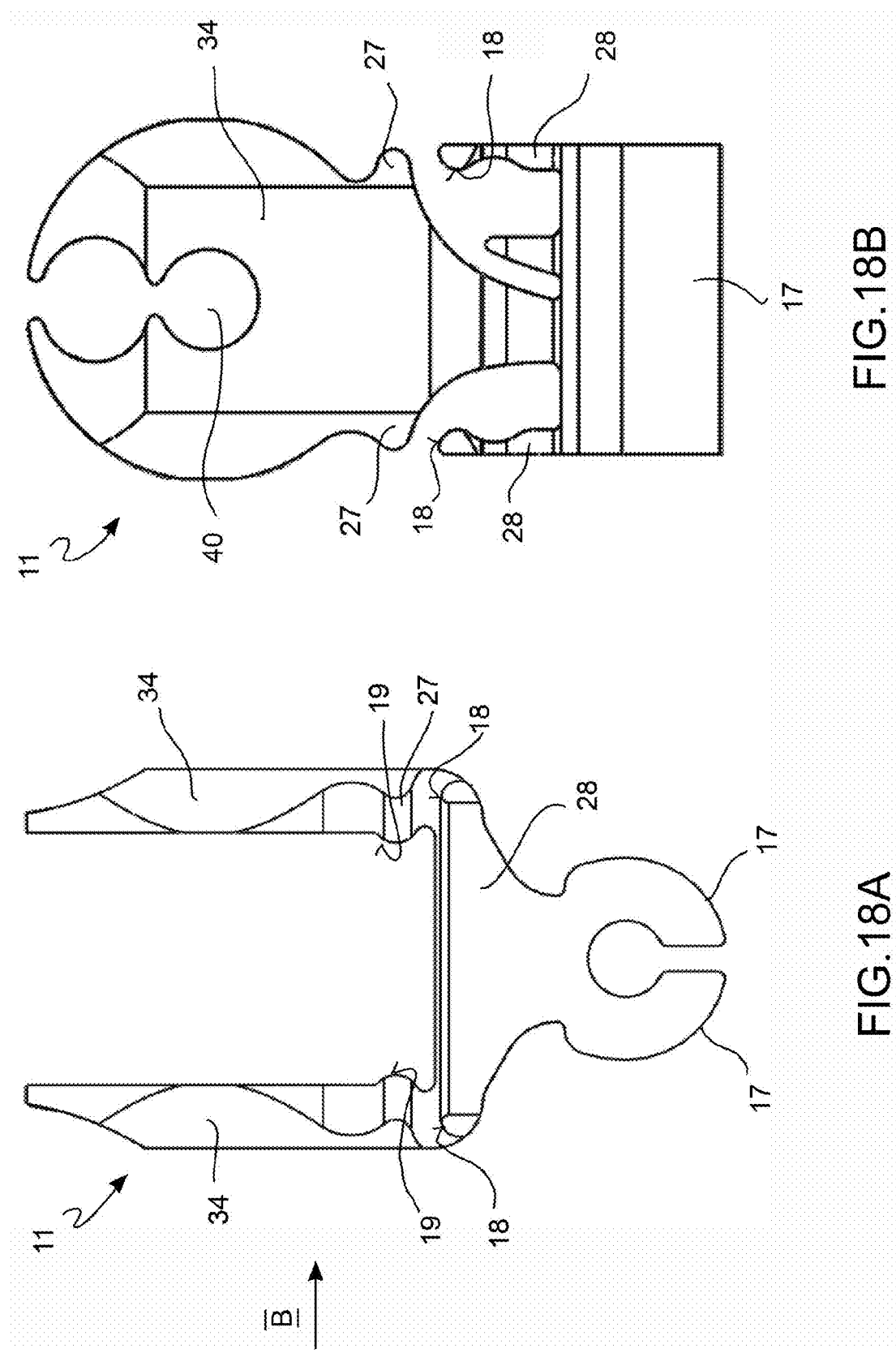

ARTICULATED SURGICAL INSTRUMENT FOR ROBOTIC SURGERY OR MICROSURGERY, MANUFACTURING METHOD AND ASSEMBLY METHOD

CROSS REFERENCE TO RELATED APPLICATION

This application claims benefit of Ser. No. 102022000014779 filed Jul. 14, 2022, in Italy, and which application is incorporated herein by reference. To the extent appropriate, a claim of priority is made to the above-disclosed application.

FIELD OF THE INVENTION

The present invention relates to a surgical instrument.

In particular, the surgical instrument according to the present invention comprises an articulated end.

The surgical instrument according to the present invention is particularly suitable for an assembly for surgical and/or microsurgical teleoperation.

The present invention also relates to a method of manufacturing at least one portion of an articulated end of the surgical instrument.

Furthermore, the present invention relates to a method of assembling a surgical instrument.

PRIOR ART

Robotic surgery apparatuses are generally known in the art and typically comprise a central robotic tower (or cart) and one or more robotic arms extending from the central robotic tower. Each arm comprises a motorized positioning system (or manipulator) for moving a surgical instrument distally attachable thereto, in order to perform surgical procedures on a patient. The patient typically lies on an operating bed located in the operating room, in which sterility is ensured to avoid bacterial contamination due to non-sterile parts of the robotic apparatus.

The miniaturization of surgical instruments and in particular of the articulated-ends ("end-effectors") thereof for robotic surgery is particularly desirable because it opens up advantageous scenarios of minimal invasiveness both for the patient undergoing surgery and the millimeter and sub-millimeter tissue dissection capacity.

For example, U.S. Ser. No. 10/582,975, WO-2017-064303 and WO-2018-18972 owned by the instant Applicant disclose various embodiments of surgical instruments suitable for robotic surgery and microsurgery, where in order to miniaturize the articulations, the tendons slide and are guided in their sliding movement without the need to provide holes or concave guide channels. In contrast, the actuation tendons are supported and kept in position by suitable convex sliding surfaces, said surfaces being ruled surfaces with generator lines all parallel to each other, each ruled sliding surface being parallel to a given axis.

Moreover, documents WO-2017-064305, EP-3362218 and EP-3597340 owned by the instant Applicant disclose some methods of manufacturing such a type of surgical instrument, and particularly the links of the articulated end of the surgical instrument, by wire electro-erosion (WEDM) making continuous cuts on orthogonal planes with the cutting wire. Such a manufacturing technique requires making open holes in the pin joints, i.e., it requires the creation of holes adapted to receive a pin which are necessarily provided with a channel for the passage of the cutting wire, the channel having a smaller size than the diameter of the pin which will be received in the hole.

WO-2018-189722 owned by the instant Applicant discloses a surgical instrument in which the tendons for actuating the degree of freedom of opening/closing of the hinged end-effector, in addition to sliding on convex ruled sliding surfaces of the end-effector links, are wound on said convex ruled sliding surfaces, describing arcuate paths which underlie a particularly high winding angle. In fact, by virtue of the low sliding friction of the tendons, they are capable of remaining in contact with the convex ruled surface of a link over a relatively long and arcuate longitudinal segment.

In addition, US-2021-0106393, also owned by the instant applicant discloses some embodiments of a tendon consisting of intertwined polymer fibers. The use of polymer tendons allows reducing the sliding friction with respect to the use of metal tendons and at the same time an adequate dimensioning of the tendon allows traveling winding longitudinal paths in the miniaturized hinged end-effector.

Surgical instruments are also known, which are provided with articulated cutting ends, actuated by means of actuating cables wound around at least two pulleys, in which the blade holder includes a distal pulley of increased diameter with respect to a proximal pulley of the same articulated end, in an attempt to increase the cutting force by increasing the radius of the distal actuation pulley. Usually, it is desirable to regardless maintain the diameter of the blade actuating pulley within the overall size of the articulated end positioning rod or shaft, so as not to increase the longitudinal size of the surgical instrument.

The need to maximize the closing torque, and thus closing force applied between the tips (jaws) of the articulated instrument, minimizing the stress on the actuating cable is felt even if the surgical instrument is not intended to perform a cutting action. For example, the surgical instrument can be required to apply a firm and durable gripping action. This need is particularly felt in miniaturized instruments the actuating cable action lever of which is very small. This need is particularly felt in miniaturized instruments using small gauge cables or polymer cables having a limited breaking force and/or a low rigidity and/or a marked plasticity when subjected to loads.

To guide the actuating cable towards a distal actuating pulley of relatively large diameter, WO-2017-098279 for example employs intermediate guide pulleys with inclined axis which are driven in rotation by the cable itself when the pulley is actuated.

A different known solution shown in U.S. Pat. No. 9,186,221 shows the actuating cables deflected from the inner distal wall of the support link ("clevis" or even "straddle"); in other words, this document shows an example in which the support link houses the actuating cable in guide channels in which the outer wall of the channel, facing the longitudinal centerline of the surgical instrument, acts as a diverter of the cable path, allowing it to be wound on the distal actuating pulley.

Such known solutions are unsuitable for miniaturization because they require many pieces to assemble and in particular further idle return pulleys to keep the actuating cables in position, or solutions which have difficult-to-perform undercut machining or guide channels which force the actuating cables in position against the walls of the cavity, decreasing the service life thereof, imposing a high friction where a relative movement is provided between actuating cable and pulley or other articulated end piece.

A different type of surgical instrument consists of instruments for electrosurgery comprising one or more electric power cables for electrically activating a typically end portion, i.e., a free end, of the articulated surgical instrument. In such known instruments for electrosurgery, typically the electrical energy is conducted by providing an electrical cable in connection with the distal portion of interest. The electrical cable is typically inflexible, and therefore fails to follow the winding paths of the articulated end actuating cables, usually resulting in bulky bends and rings formed by the same electrical cable when the articulated end articulates, i.e., moves. Such an effect achieved by electric power cables is clearly particularly apparent but undesired in the case of miniaturized surgical instruments, because the formation of such "curls" or "flying" segments transversely cantilevered, towards the outside of the power cable, would frustrate the design efforts aimed at obtaining a minimum volume of the pieces and components of the miniaturized articulated end. In order to avoid the formation of such bends and rings which extend well beyond the volume of the articulated end, risking undesirably interfering with the patient's anatomy and/or with another surgical instrument and/or with other elements of the surgical site, the articulations of the electrosurgical instrument are used at a minimum, attempting to keep the articulated instrument always in a straight elongated position.

Therefore, the need is strongly felt to provide a solution capable of increasing the closing torque in a miniaturized articulated surgical instrument, without imposing an increased gauge of the instrument itself, and without reducing the mobility of the articulations.

Therefore, the need is strongly felt to provide a solution capable of minimizing the stress on the actuating cable of a miniaturized articulated surgical instrument which uses small gauge cables or polymer cables having a limited breaking force and/or a low rigidity and/or a marked plasticity when subjected to loads Moreover, the need is felt to provide cables for an articulated surgical instrument which are durable and reliable, even where they are required to slide on the articulated end when in operating conditions.

SUMMARY OF THE INVENTION

It is an object of the present invention to obviate the drawbacks complained of with reference to the prior art.

It is a further object of the present invention to provide an articulated surgical instrument adapted to be miniaturized.

This and other objects are achieved by a surgical instrument, a manufacturing method, and an assembly method as described and claimed herein.

Some advantageous embodiments are also described.

According to an aspect of the present invention, a surgical instrument comprises an articulated end comprising a support structure and a second link articulated with respect to the support structure about a rotation axis, and a transmission cable fixed to the second link.

The support structure can comprise at least a first sliding surface which is a convex surface, ruled with straight generator lines all parallel to each other and a second sliding surface which is a convex surface, ruled with straight generator lines all parallel to each other.

The support structure can comprise a support link and both the at least a first surface and the second surface can be made in a single with said support link.

The transmission cable is configured to slide on both said at least a first surface and said second surface when the second link rotates with respect to the support structure.

The straight generator lines of the at least a first convex, ruled sliding surface are orthogonal to the generator lines of the second convex, ruled sliding surface.

The second convex ruled surface may be parallel to the relative rotation axis between the second link and the support structure.

At least one sliding surface between the at least a first surface and the second surface can face a definable longitudinal centerline of the articulated end.

The transmission cable can be wound around a winding pulley of the second link.

The transmission cable can be fixed to the winding pulley.

The transmission cable can comprise an operative distal end for dragging the second link which is received in a termination site formed in the discoidal volume of the winding pulley.

The winding pulley can comprise a winding surface for the transmission cable which is a convex ruled surface having straight generator lines all parallel to each other and parallel to the straight generator lines of the second sliding surface.

The winding pulley of the second link can protrude transversally with respect to the second convex ruled sliding surface.

The radius of the winding pulley can be greater than or equal to the distance between the first or second convex ruled surface and the central axis of the surgical instrument.

Preferably, the sliding contact angle between the transmission cable and at least one of said at least a first surface and said second surface does not change for any operating configuration of the articulated end.

The at least a first sliding surface and the second sliding surface are preferably longitudinally spaced apart from each other.

By virtue of the proposed solutions, a miniaturized surgical instrument is provided in which the closing torque is maximized.

By virtue of the proposed solutions, a miniaturized surgical instrument is provided in which the load on the actuating cables is optimized.

By virtue of the proposed solutions, a miniaturized surgical instrument is provided which is fitted with cables sliding on surfaces of the articulated end of the instrument when in operating conditions, which is capable of both keeping the friction of cable-surface sliding minimal and keeping the cable within the volume of the articulated end.

According to an aspect of the present invention, a manufacturing method by wire electro-erosion is provided for at least said first support link of an articulated end of a surgical instrument, said first support link comprising both said convex ruled sliding surfaces having straight generator lines orthogonal to each other, said method comprising the steps of: (i) providing a wire electro-erosion machine having a cutting wire; (ii) mounting at least one workpiece to the wire electro-erosion machine; (iii) making with the cutting wire of the wire electro-erosion machine a first through cut on the at least one workpiece, making said at least a first convex ruled sliding surface; (iv) rotating the at least one workpiece with respect to the cutting wire by 90°; (v) making with the cutting wire of the wire electro-erosion machine a second through cut on the same at least one workpiece, making a second convex ruled sliding surface.

The first support link can be simultaneously or subsequently shaped by wire electro-erosion.

According to an aspect of the present invention, an assembly method is provided for a surgical instrument comprising the steps of: (i) inserting an articulation pin into through holes of a first support link and a second link, and preferably also of a third link; (ii) fixing an operative distal end of a traction action transmission cable in a termination seat provided in the body of a winding pulley of the second link; and (iii) winding a distal portion, which is adjacent to the operative distal end of the transmission cable, on the surface of the winding pulley.

The step of fixing the operative distal end of the transmission cable can further comprise: making a through axial alignment configuration of the termination seat of the winding pulley of the second link with an assemblage window of a prong of the first support link, and axially inserting the operative distal end of the transmission cable into the assemblage window of the prong of the support link as well as into the termination seat of the winding pulley of the second link, axially aligned thereto.

By virtue of such an assembly method, a simple solution and at the same time a robust assembly are provided.

BRIEF DESCRIPTION OF THE DRAWINGS

Further features and advantages of the present invention will become apparent from the following description of preferred embodiments, given by way of non-limiting indication, with reference to the accompanying drawings which are briefly described below. It should be noted that references to "an" embodiment in this disclosure do not necessarily refer to the same embodiment, and are to be understood as at least one. Moreover, for reasons of conciseness and reduction of the total number of figures, a certain figure can be used to illustrate the features of more than one embodiment, and not all the elements of the figure can be necessary for a certain embodiment.

FIG. 18A is a plan view of a support link of an articulated end, according to an embodiment.

FIG. 18B is a plan view of the support link in FIG. 18A according to the viewpoint indicated with arrow B in FIG. 18A.

DETAILED DESCRIPTION

Figure 1:
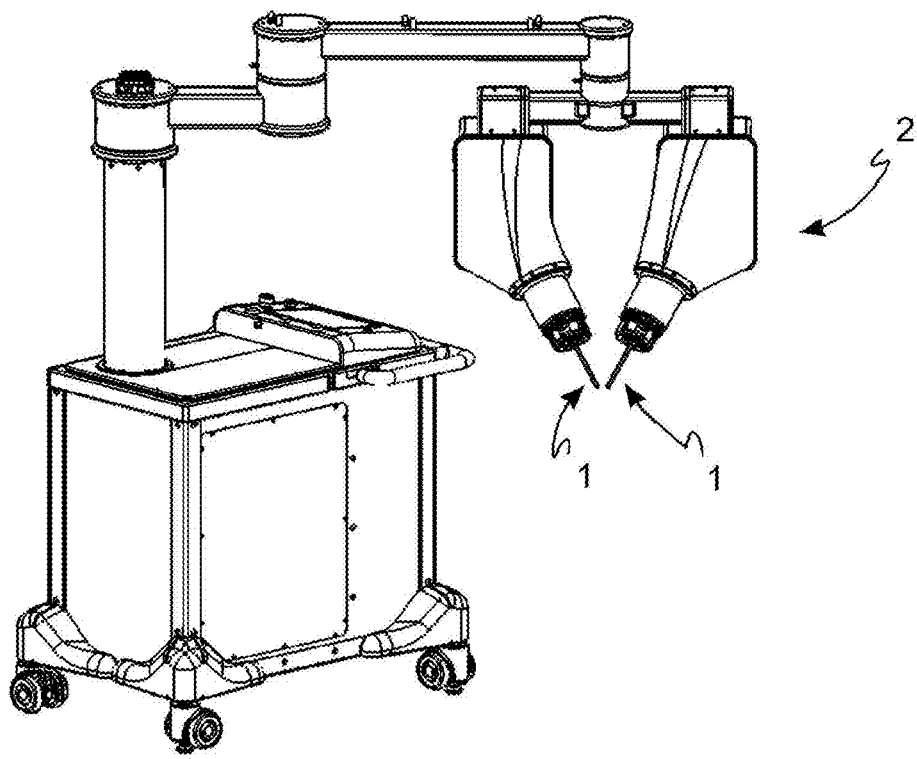
FIG. 1 is an axonometric view of a robotic teleoperation assembly, according to an embodiment.
Figure 2:
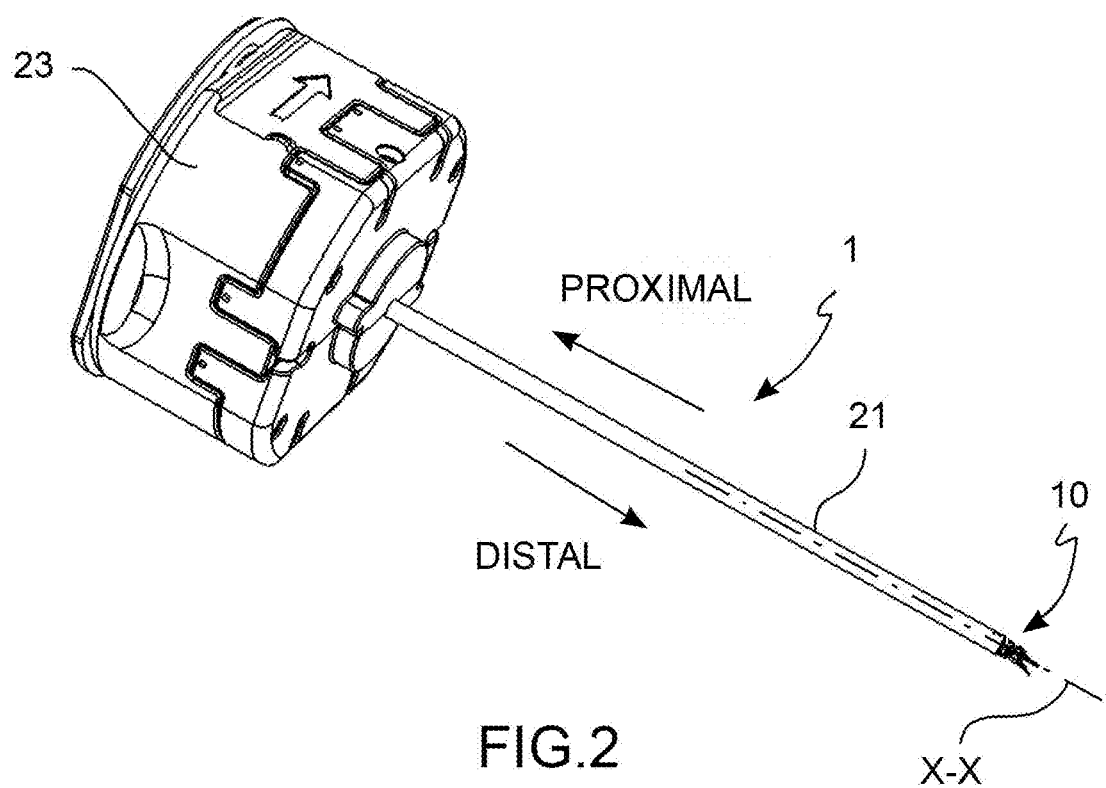
FIG. 2 is an axonometric view of a surgical instrument, according to an embodiment.
Figure 3:
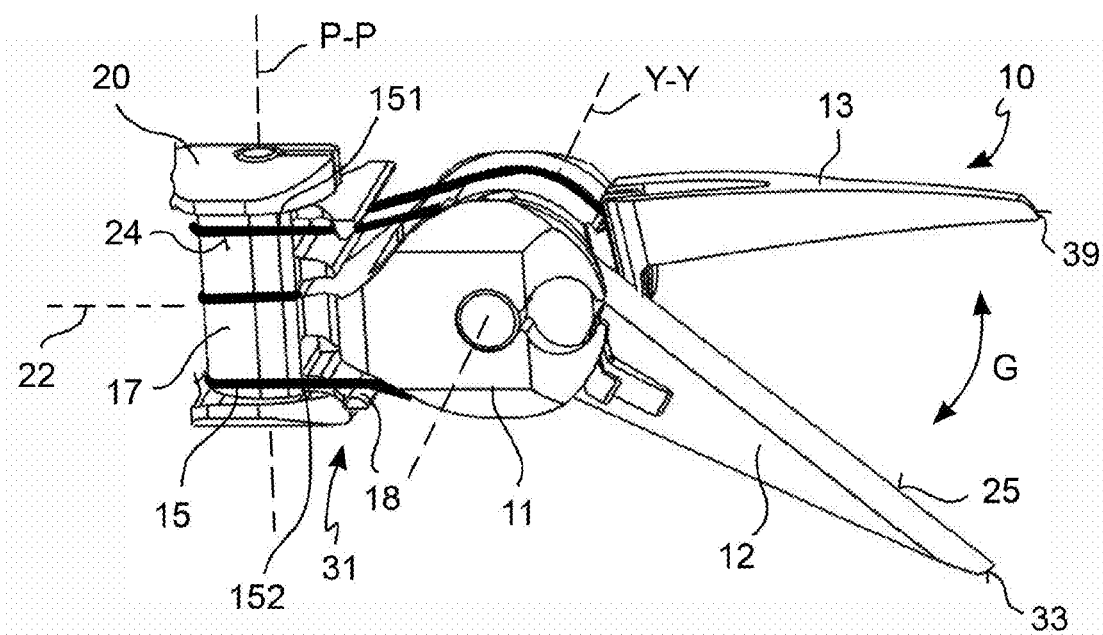
FIG. 3 is an axonometric view of an articulated end of a surgical instrument, according to an embodiment.

Reference throughout this description to "an embodiment" means that a particular feature, structure or function described in relation to the embodiment is included in at least one embodiment of the present invention. Therefore, the formulation "in an embodiment" in various parts of this description do not necessarily all refer to the same embodiment. Furthermore, particular features, structures or functions such as those shown in different drawings can be combined in any suitable manner in one or more embodiments.

In accordance with a general embodiment, a surgical instrument 1 is provided, comprising an articulated end 10 or articulated end-effector 10. The articulated end 10 can comprise at least one free end and/or at least one opening/closing articulation G (gripping and/or cutting).

The surgical instrument 1 is particularly adapted to be mounted on a robotic assembly 2 for medical or surgical or microsurgical teleoperation.

The articulated end 10 can comprise a plurality of links 11, 12, 13, 20 articulated to each other by the provision of one or more rotational joints. Preferably, the articulated end 10 comprises a plurality of degrees of freedom which are moved by the provision of a plurality of transmission cables of a traction action 15 (or actuation tendons 15) extending from the proximal transmission interface portion 23 along the longitudinal extension of a positioning rod or shaft 21 of the surgical instrument 1 to reach the articulated end 10.

The articulated end 10 of the surgical instrument 1 comprises a support structure 31 comprising at least a first support link 11 and a second link 12 which is articulated with respect to the first support link 11 of the support structure 31. Therefore, the first support link 11 and the second link 12 are articulated so that they can rotate with respect to one another about a rotation axis Y-Y. For example, the rotation axis Y-Y is the yaw axis of the articulated end 10. For example, the first support link 11 and the second link 12 form a rotational pin joint.

The second link 12 can comprise a free terminal end 33 forming a terminal end of the surgical instrument 1.

The articulated end 10 can further comprise a third link 13 which is articulated with respect to the first support link 11 of the support structure 31 and which forms an opening/closing articulation G with said second link 12. In this case, the third link 13 and the second link 12 are articulated with respect to one another about a rotation axis (which can coincide with the yaw rotation axis Y-Y mentioned above). The third link 13 can also comprise a terminal free end 39 forming the terminal end of the surgical instrument 1, for example together with the terminal free end 33 of the second link 12, in which the terminal ends 33 and 39 of the respective links 12, 13 are movable with respect to one another in opening/closing G, for example by rotating with respect to one another about the yaw axis Y-Y. Other configurations are also possible, for example the third link 13 can be articulated to the second link 12 about a rotation axis which is distal to the yaw rotation axis Y-Y.

The first support link 11 preferably comprises two prongs 34 extending distally forming an assembly seat for an articulation pin 35 and at least the winding pulley 14 of the second link.

The winding pulley 14 preferably delimits a through axial hole 36 for receiving the articulation pin 35. The prongs 34 of the support link 11 can also comprise respective through holes for receiving the articulation pin 35.

In accordance with an embodiment, the articulation pin 35 is rotationally integral with the winding pulley 14 of the second link 12. For example, the articulation pin 35 is keyed in the through hole of the winding pulley 14.

The provision of the articulation pin being rotationally integral with the winding pulley, when provided in a configuration in which the rotation axes, and thus preferably also the articulation pins, of the degree of freedom of yaw and opening/closing (grip) of the articulated end coincide, allows reducing the cutting reaction on the articulation pin 35 itself. This facilitates movement of the yaw articulation when in gripping or squeezing or cutting conditions of the articulated end 10 of the surgical instrument.

In fact, in operating and squeezing or gripping or cutting conditions, the reaction to the gripping force on the respective links 12, 13 generates two equal and opposite cutting forces on the articulation pin 35 which in turn generate torques of rolling friction between articulation pin 35 and respective winding pulleys of the links 12, 13 which tend to "bind", i.e., make the three elements (pin 35, link 12 and link 13) rotationally integral with respect to the first support link 11. For this reason, if the articulation pin 35 were rotationally integral with the first support link 11 (for example keyed onto the prongs 34), the elongated body of the links 12 and 13 would substantially form a clamp on the articulation pin. Otherwise, by making the articulation pin 35 rotationally integral with the winding pulley 14 of the second link 12, it is possible to utilize the effect described above in an advantageous manner, and in particular aimed at making the links 12 and 13 rotationally integral only during the gripping or cutting or squeezing action, while maintaining a free rotation between the pin and the prongs 34 of the first support link 11, since the deformations of the pin and prongs are minimal in the mutual coupling areas.

Preferably, the axial through hole 36 of the winding pulley 14 of the second link 12 comprises at least one elastically deformable wall 37, for example formed by a cantilevered tab 37, for elastically clamping the articulation pin 35, so that the second link 12 is rotationally integral with the articulation pin 35, for example during the movement of the degree of freedom of opening/closing G as well as during the assembly of the links 11, 12, 13 of the articulated end 10 and for example of the yaw rotational joint.

The support structure 31 comprising said first support link 11 can be an articulated structure, i.e., having at least one internal degree of freedom formed by an articulated joint between two or more links, and comprising a further link (e.g., the proximal link 20) articulated to the first support link 11. For example, the support structure 31 can comprise therein a pitch articulation about the pitch rotation axis P-P between the proximal link 20 and the first support link 11, and at the same time can form a yaw articulation with the second link 12 as well as with the third link 13 about the yaw rotation axis Y-Y, which is orthogonal to the pitch rotation axis P-P. The proximal link 20 can be fixed to the shaft or rod 21.

It should be clear that the terms pitch and yaw are used arbitrarily for better clarity of the explanation, in accordance with a preferred embodiment. In accordance with another embodiment, for example, the pitch rotation axis P-P and the yaw rotation axis Y-Y form an angle other than 90° therebetween.

The articulated end 10 further comprises a transmission cable 15, 16 fixed to the second link 12.

In accordance with a preferred embodiment, said transmission cable is a traction action transmission cable 15 configured to apply a traction action to said second link 12 to rotate it with respect to the first support link 11. A traction action transmission cable can be provided, configured to apply a traction action to said third link 13 to rotate it with respect to the first support link 11 and preferably also with respect to the second link 12.

Figure 21:
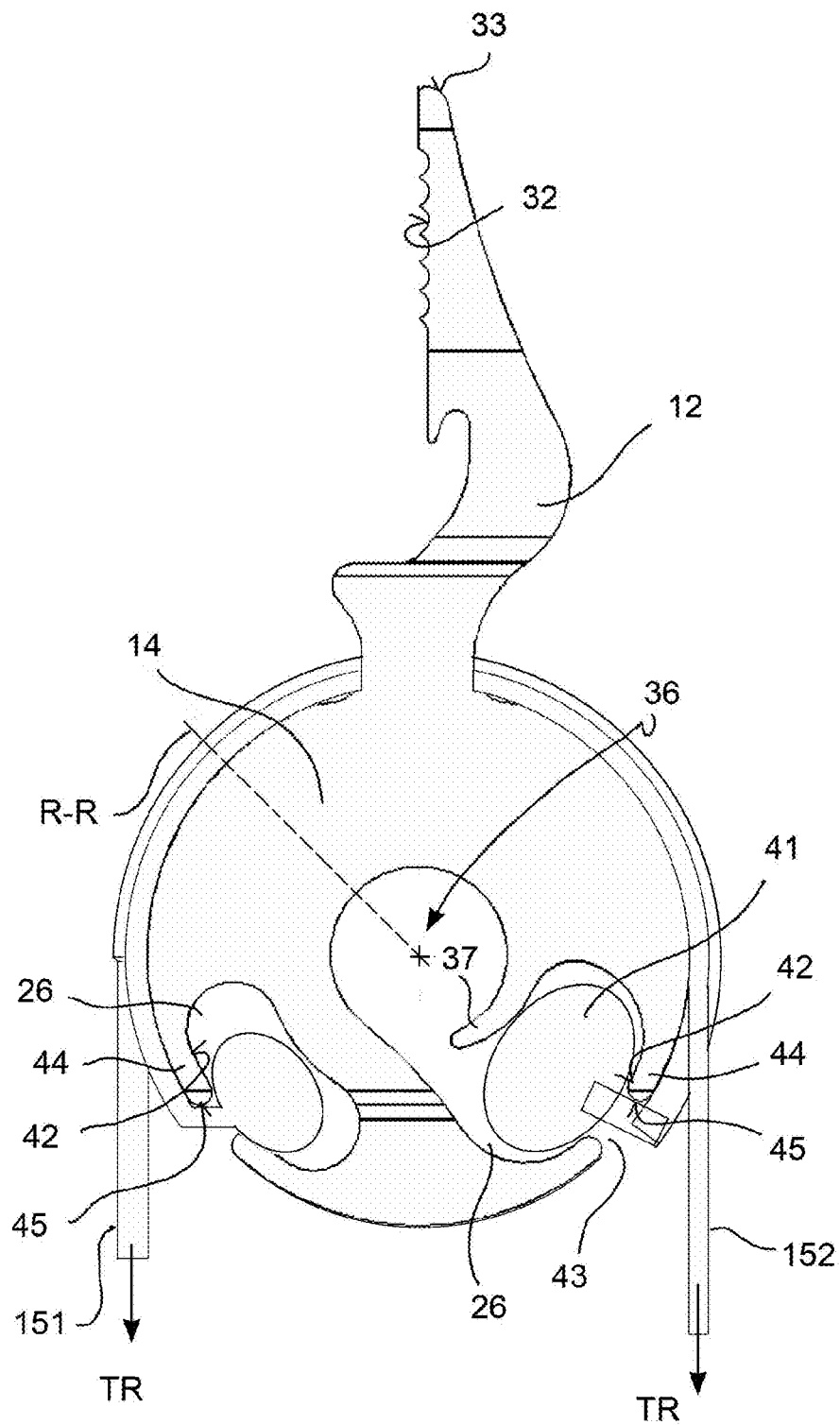
FIG. 21 is a plan view of a second link of an articulated end, according to an embodiment, in which two transmission cables are shown.

Preferably, the first support link 11, the second link 12 and the third link 13 are each moved by a pair of antagonist actuating cables 151, 152, which can be received in respective termination seats 26 provided in the body of the winding pulley 14 of the second link 12, as shown for example in FIG. 21. Other configurations are possible. For example, the termination seat 26 can be made on the outer radial surface of the winding pulley 14, for example by including radial reliefs extending from the pulley forming an undercut seat for the transmission cable 15 of a traction action TR. The transmission cable 15 of a traction action TR can thus apply a traction action TR to the second link 12 thus causing the winding pulley 14 and thus the terminal free end 33 in opening/closing G, where provided, to be driven in rotation by virtue of the undercut abutment 42.

The third link 13 can also comprise a winding pulley as described with reference to the winding pulley 14 of the second link 12.

In accordance with a preferred embodiment, the winding pulley 14 comprises a substantially discoidal body delimiting at least one termination seat 26 for an operative distal end 41 of a transmission cable 15, which can be an enlarged operative distal end 41 formed for example by a node consisting of the same transmission cable 15 to increase the contact surface with an undercut dragging wall 42 formed by the body of the winding pulley 14 at the inlet 43 of the termination seat 26. The mouth 43 or inlet 43 of the termination seat 26 can be facing radially outwards, as for example shown in FIG. 21, i.e., it can extend from the discoidal body of the winding pulley 14 in the radial direction R-R with respect to the radius of the disc. The mouth 43 or inlet 43 of the termination seat 26 can also be facing axially, i.e., it can also open in a direction parallel to the rotation axis Y-Y forming an axial through seat.

The undercut wall 42 on which the operative distal end 41 of the transmission cable 15 abuts to drive in rotation the winding pulley 14 of the second link 12 can be formed by a cantilevered circumferential protrusion 44 (i.e., circumferentially extending forming a free end) of the discoidal body of the winding pulley 14 delimiting the radially open mouth 43 of the termination seat 26. Preferably, therefore, the contact surface 45 of the cantilevered circumferential protrusion 44 which comes into contact with a segment of the transmission cable 15 which is adjacent to the distal end 41 thereof can be a convex curved surface and free of circumferentially and/or radially facing edges with respect to the discoidal body of the winding pulley 14 of the second link 12. For example, such a contact surface 45 of the winding pulley 14 is a convex ruled surface formed by generator lines all parallel to each other and parallel to the rotation axis Y-Y of the winding pulley 14 of the second link 12.

Alternatively, or in addition, an electric power transmission cable 16 configured to transmit electric power to said second link 12 can be provided. In this case, the surgical instrument 1 can be an electrosurgical or micro-electrosurgical instrument. An electric power transmission cable 16 configured to transmit electric power to said third link 13 can be provided. In this case, the second link 12 can be a link adapted to perform a gripping action and comprising a gripping surface 32.

In accordance with an embodiment, the support structure 31 of the articulated end 10 comprises at least a first convex surface 17, 19, ruled with straight generator lines 7C all parallel to each other, and at least a second convex surface 18, ruled with straight generator lines u all parallel to each other.

In accordance with a preferred embodiment, the first support link 11 of the articulated end 10 comprises at least a first convex surface 17, 19, ruled with straight generator lines 7C all parallel to each other, and at least a second convex surface 18, ruled with straight generator lines u all parallel to each other.

Advantageously, the straight generator lines 7C of the at least a first convex, ruled surface 17, 19 are orthogonal to the straight generator lines v of the second convex, ruled surface 18. In accordance with an embodiment, the at least a first, ruled, convex surface 17, 19 has straight generator lines 7C all parallel to the pitch rotation axis P-P and the second, ruled, convex surface 18 has straight generator lines v all parallel to the yaw rotation axis Y-Y. Therefore, the convex ruled surfaces 17, 18, 19 are curved surfaces and at the same time parallel to a respective generator line π, υ direction.

With further advantage, the transmission cable 15 or 16 is configured to slide on both said at least a first surface 17, 19 and said second surface 18 of the first support link 11 when the second link 12 rotates with respect to the first support link 11.

The sliding direction of the transmission cable 15 or 16 on the respective convex ruled surface 17, 18, 19 is in turn always orthogonal to the generator lines of the convex ruled surface on which the transmission cable slides. Thereby, the curvature of the convex ruled surface 17, 18, 19 faces the transmission cable 15, 16 sliding on said convex ruled surface, and in a transverse direction with respect to the transmission cable 15 the convex ruled surface 17, 18, 19 is substantially flat. Thereby, the transmission cable slides orthogonal to the generator lines of the respective convex ruled surfaces.

The proximal link 20 can comprise a third convex ruled surface 30 with straight generator lines all parallel to each other for the sliding of a proximal segment of the transmission cable 15, 16.

Preferably, the straight generator lines of the third convex ruled surface 30 are all parallel to the generator lines of the at least a first ruled surface 17, 19, for example parallel to the pitch rotation axis P-P.

The straight generator lines of the third convex ruled surface 30 can all be parallel to the generator lines of the second convex ruled surface 18, for example parallel to the yaw rotation axis Y-Y of the articulated end 10.

The at least a first and/or second convex ruled sliding surface 17, 18, 19 can be provided on the proximal link 20 instead of on the first support link 11. In accordance with an embodiment, said proximal link 20 can comprise a third ruled surface 30 and a fourth convex ruled surface, perpendicular to each other. The presence of one or more convex ruled sliding surfaces also on the proximal link 20 ensures the adhesion of the actuating cable to the links forming the articulated end during the movement thereof for the entire range of motion.

Preferably, there is no sliding of the transmission cable 15 or 16 on the second link 12. In accordance with a preferred embodiment, the second link 12 comprises a winding pulley 14 and the transmission cable 15 of a traction action is wound about said winding pulley 14. Under operating conditions, the traction action transmission cable 15 is pulled in order to rotate, about the rotation axis Y-Y, the second link 12 with respect to the first support link 11. The traction of the transmission cable 15 implies that the transmission cable 15 slides on both said at least a first convex ruled surface 17, 19 having generator lines parallel to the pitch axis P-P and on said second convex ruled surface 18 having generator lines parallel to the yaw axis Y-Y. Otherwise, there is no sliding of the same transmission cable 15 on the winding pulley 14 of the second link 12 because the transmission cable 15 winds and unwinds on said pulley 14 without sliding. The transmission cable 15 is preferably terminated in a termination seat 26 integral with said winding pulley 14 of the second link 12.

The winding pulley 14 is preferably made in a single piece with the body of the second link 12 and with the terminal end 33 thereof. Alternatively, the second link 12 is formed by at least two rotationally integral pieces assembled together, and said at least two pieces of the second link 12 can comprise the winding pulley 14 and a blade link 25, said winding pulley forming a kind of blade holder link. Alternatively, the second link 12 is formed by at least two pieces assembled together which are rotationally movable with respect to each other, and said at least two pieces of the second link 12 can comprise the winding pulley 14 and a blade link 25 rotatable with respect to the winding pulley. The free end 33 of the second link 12 can be made in a single piece with the winding pulley 14 or with the blade link 25.

The assembly of the transmission cable 15 of a traction action TR can occur by axially inserting the terminal end 41 of the transmission cable 15 into the termination seat 26 of the winding pulley 14 of the second link 12. The second link 12 can then be assembled to the first support link 11 and/or the third link 13 by inserting the articulation pin 35 into the respective through holes of the links 11, 12, 13. Where an elastic tab 37 to clamp the articulation pin 35 is provided, the articulation pin 35 can be first assembled to the second link 12.

The prongs 34 of the support link 11 can comprise an assemblage window 48, i.e., a through opening in the direction of the rotation axis Y-Y specifically provided at the same radial height (i.e., along the radius of the pulley 14 of the second link 12) of the termination seat 26 of the second link 12, so as to define at least a relative arrangement between the first support link 11 and the second link 12 in which the assemblage window 48 of the first support link 11 is aligned with the termination seat 26 of the second link 12, thus allowing the enlarged distal end 41 of the transmission cable 15 of a traction action TR to be assembled by inserting it axially into both the assemblage window 48 of the first support link 11 and the termination seat 26 of the winding pulley 14 of the second link, when the second link 12 is assembled to the first support link 11.

The convex ruled surfaces 17, 18, 19, 30, 45 can be made by a manufacturing process by wire electro-erosion on two cutting planes, for example two orthogonal cutting planes so that the cutting wire 51 of the wire electro-erosion machine 50 is parallel to the pitch rotation axis P-P or the yaw rotation axis Y-Y in each cutting configuration.

For example, the through hole 36 of the second link 12 for receiving the articulation pin 35 can be made communicating with the through hole forming the termination seat 26, by a manufacturing process by wire electro-erosion in which the cutting wire describes a continuous cutting path also making through holes.

In accordance with a preferred embodiment, the first support link 11 is made in a single piece by wire electro-erosion, and in particular by two cuts on respective cutting planes which are orthogonal to each other. It is therefore possible to create convex ruled sliding surfaces on a single link which are orthogonal to each other and at the same time arranged along the path of the transmission cable.

In accordance with a preferred embodiment, the winding pulley 14 protrudes transversally with respect to the second convex ruled surface 18 of the first support link 11.

Preferably, the winding pulley 14 of the second link 12 has transverse extension defining the maximum transverse dimension of the articulated end 10.

The winding pulley 14 of the second link 12 can have a greater diameter than the transverse extension of the positioning rod or shaft 21 of the surgical instrument 1, although preferably the diameter of the winding pulley 14 is equal to or less than the transverse extension of the positioning rod or shaft 21.

Figure 10:
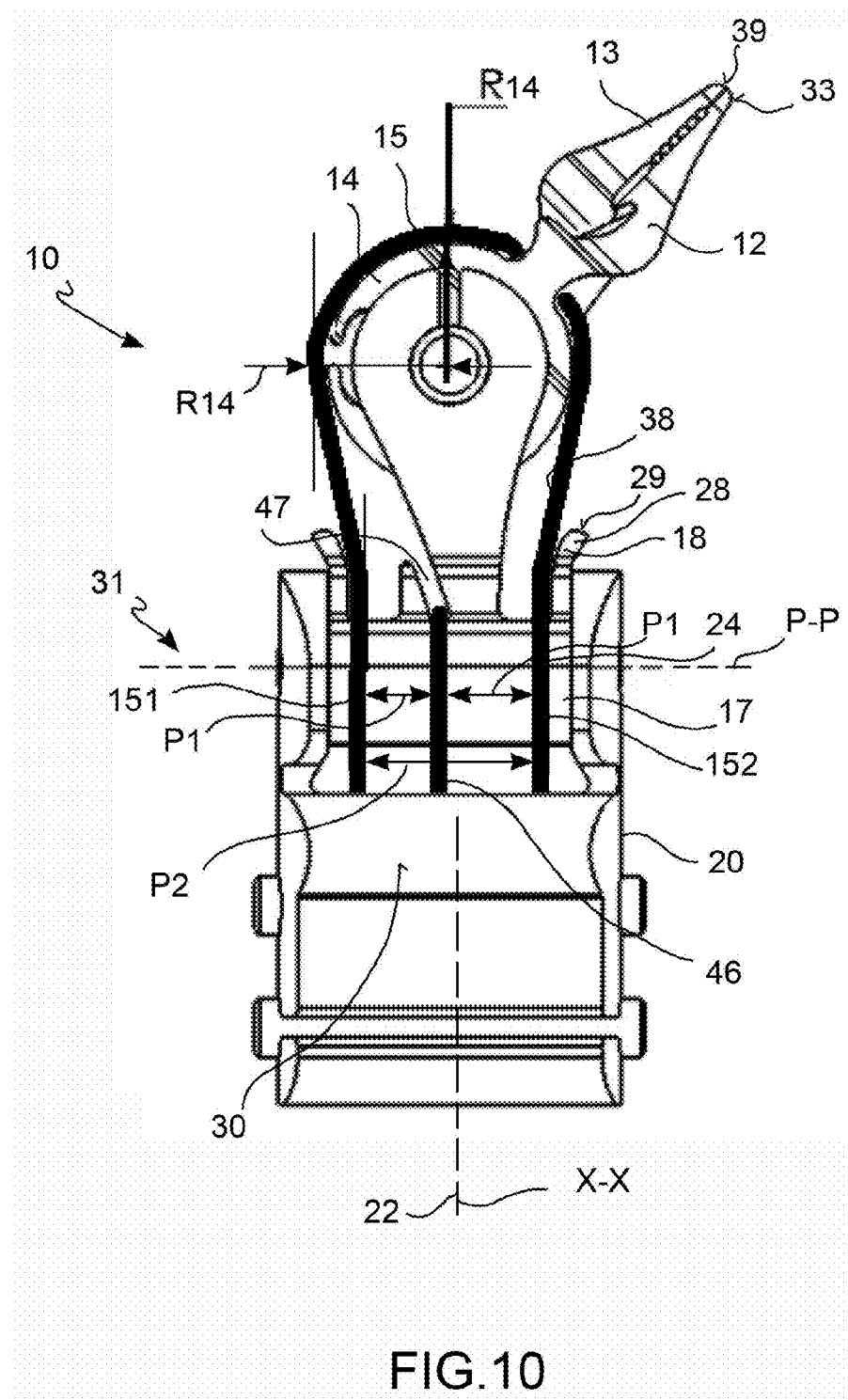
FIG. 10 is a plan view of an articulated end, according to an embodiment.
Figure 11:
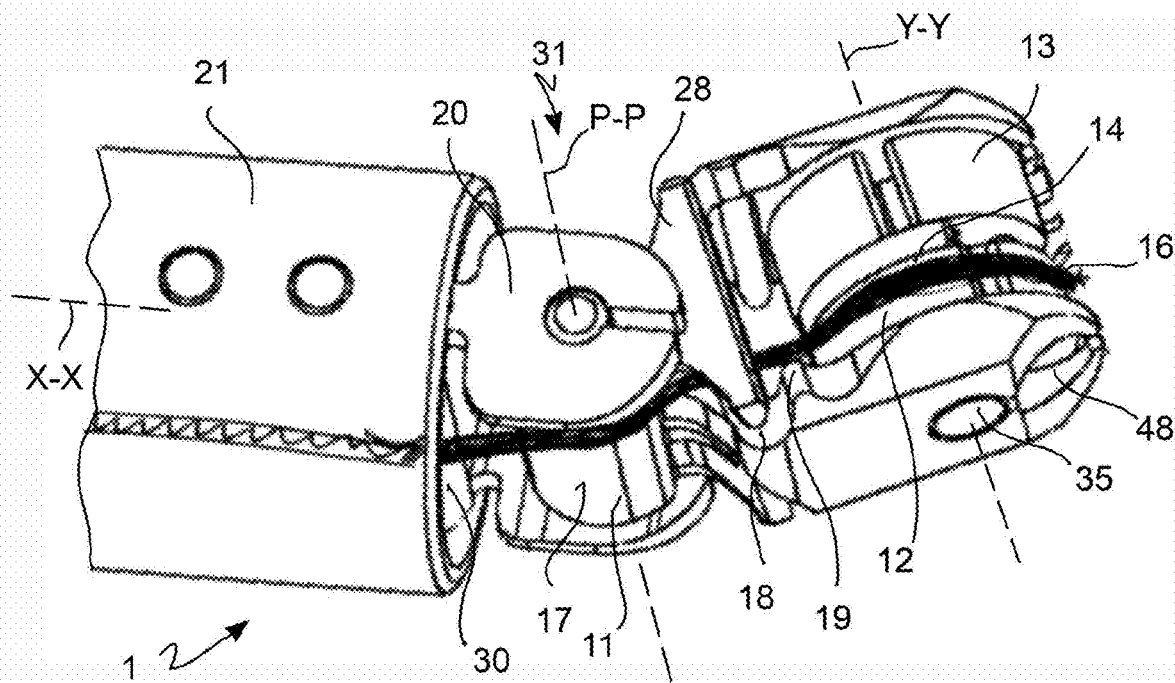
FIG. 11 is an axonometric view of a portion of a surgical instrument comprising an articulated end, according to an embodiment.
Figure 12:
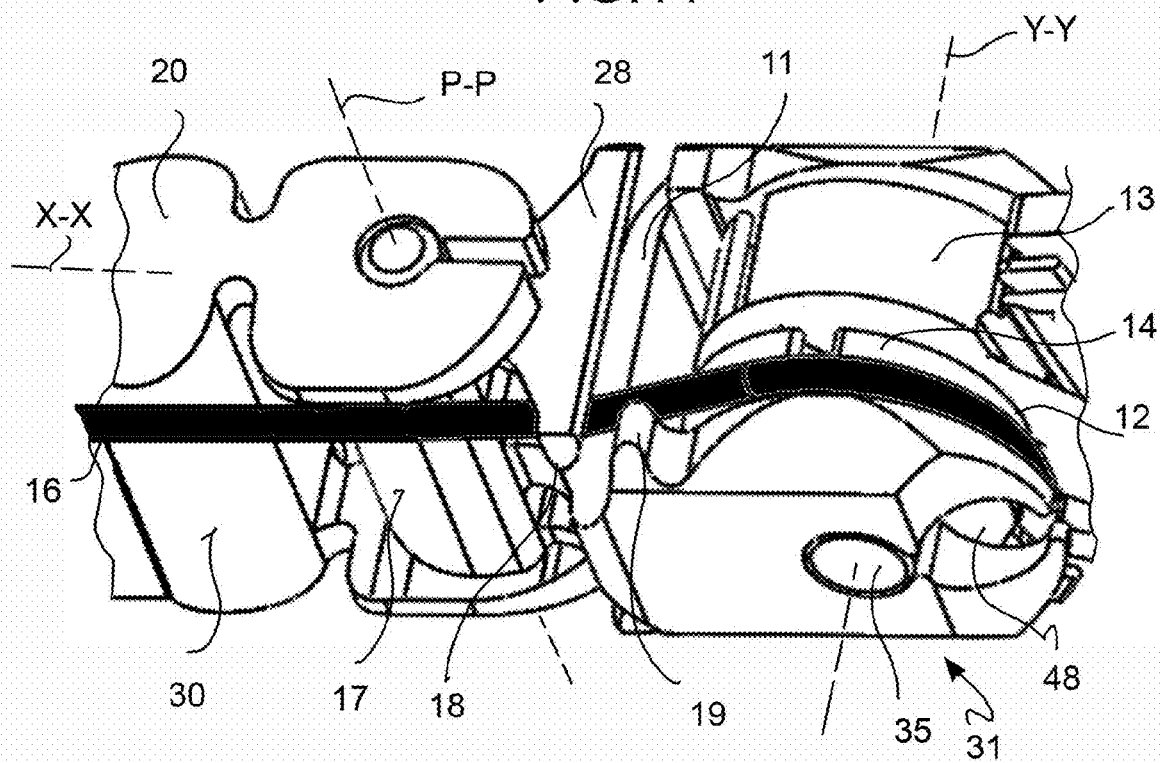
FIG. 12 is an axonometric view of a portion of the surgical instrument in FIG. 11 in which some parts are omitted for clarity.
Figure 13:
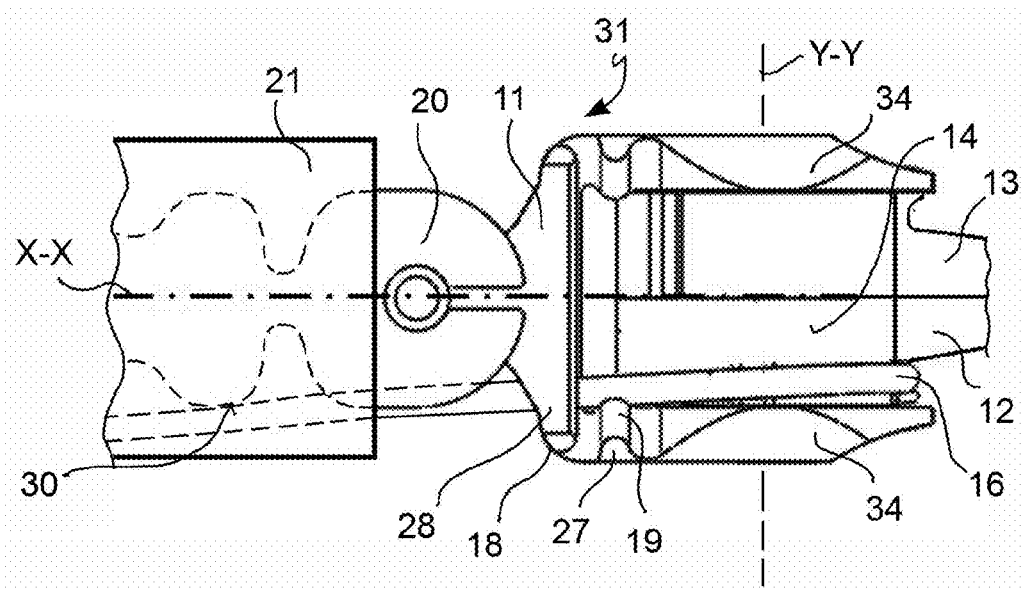
FIG. 13 is a plan view of the surgical instrument in FIG. 11 diagrammatically showing in a dashed line some details of a link of the articulated end not visible.
Figure 14:
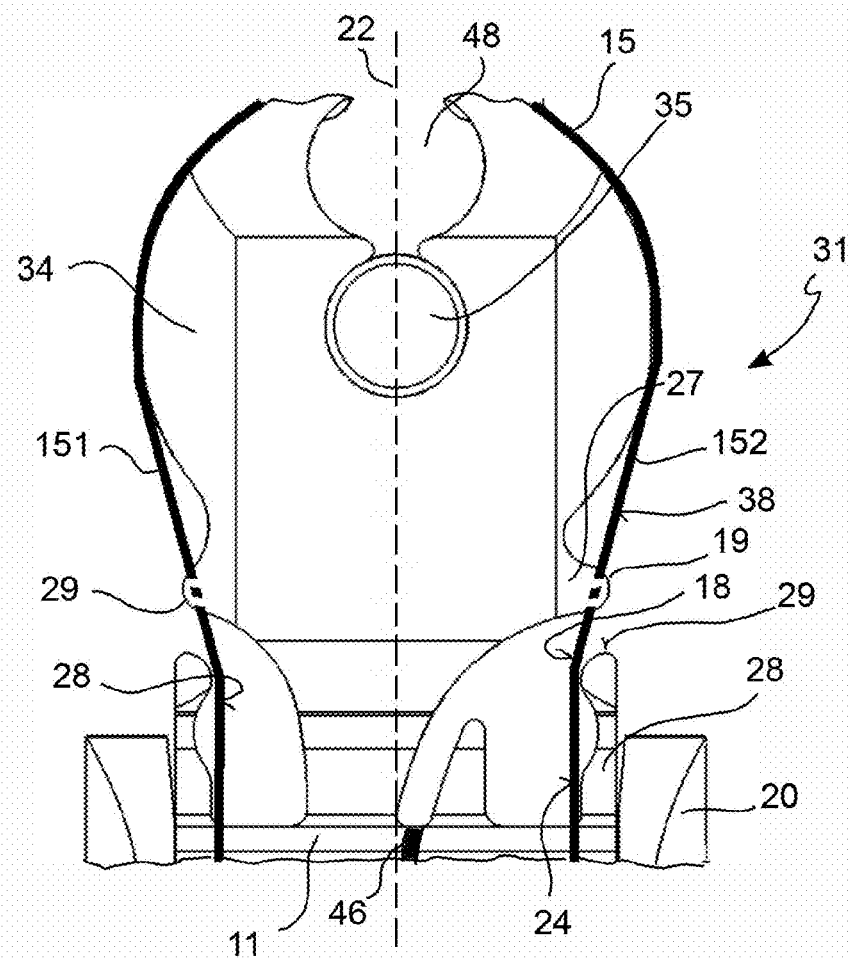
FIG. 14 is a plan view of a portion of an articulated end, according to an embodiment.
Figure 15:
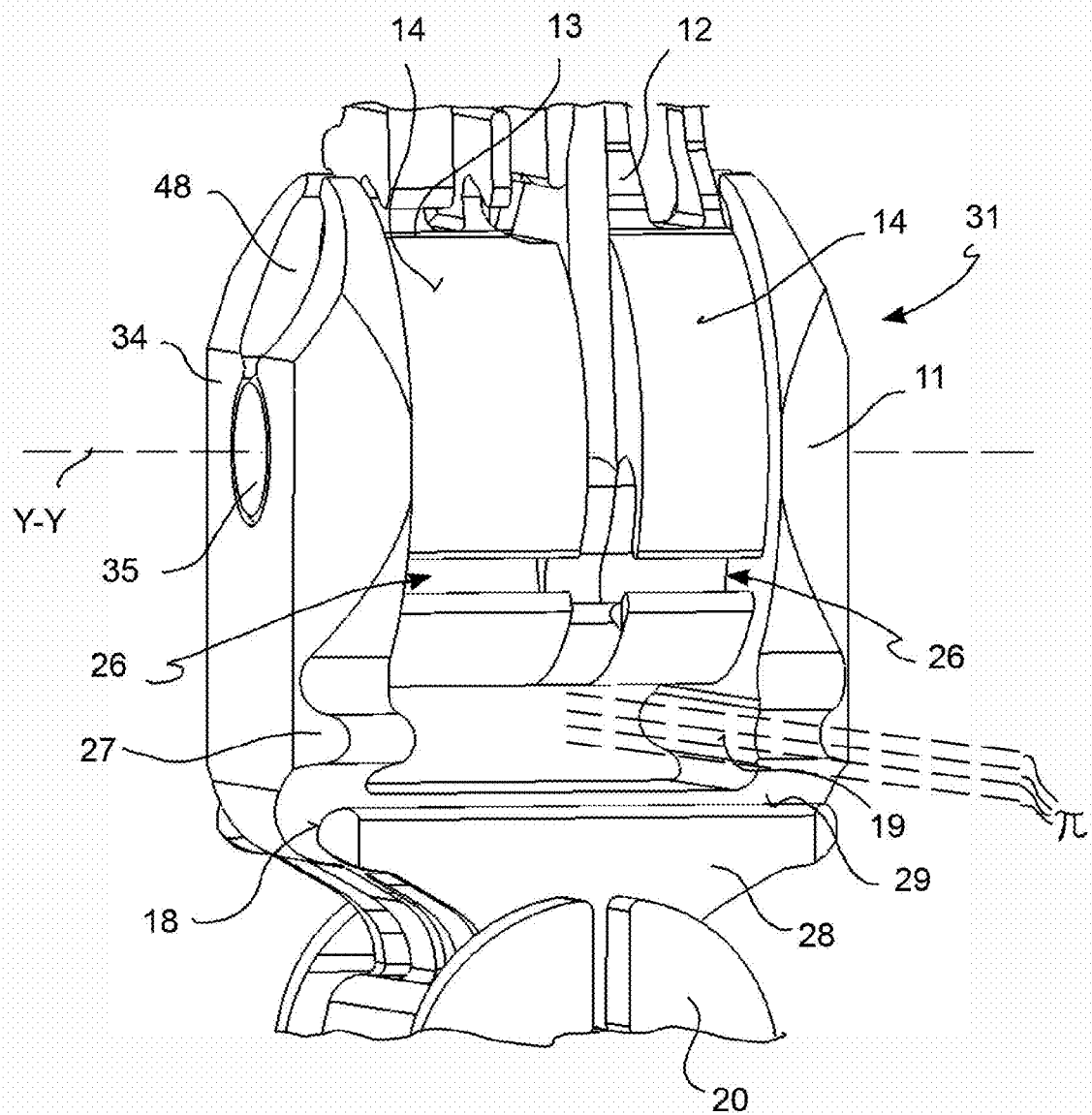
FIG. 15 is an axonometric view of a portion of an articulated end, according to an embodiment.
Figure 16:
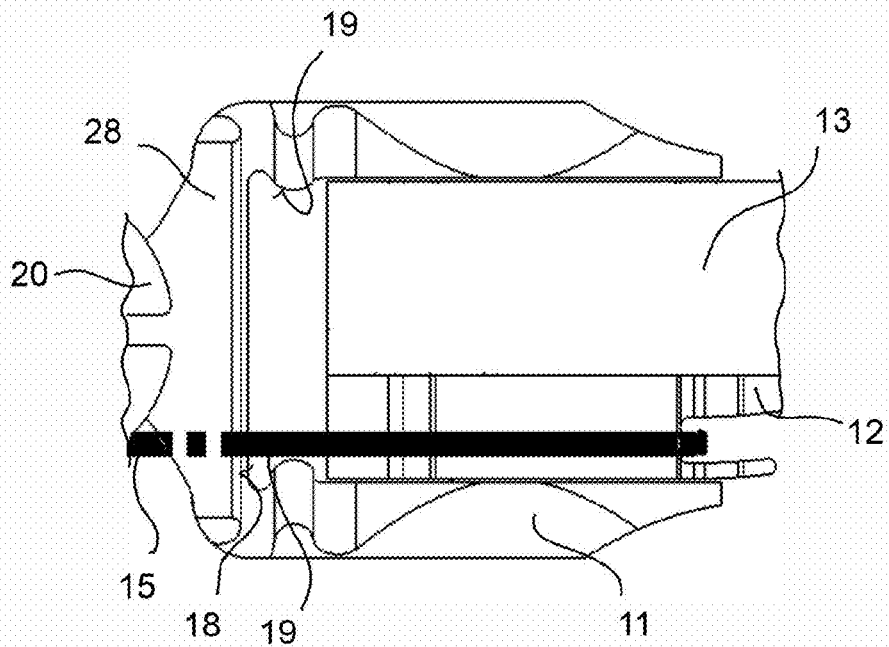
FIG. 16 is a plan view of a portion of an articulated end, according to an embodiment.

In accordance with an embodiment, as shown for example in FIG. 10, the winding pulley 14 of the second link 12 has a greater radius R14 than the transverse distance P1 between the path described by the transmission cable 15, 16 on said at least a first surface 17, 19 and said at least a second surface 18 and the longitudinal centerline 22 of the articulated end 10. In other words, as shown for example in FIG. 10, the diameter of the winding pulley 14 is greater than the transverse distance P2, measured along the pitch axis P-P, for example, between the path described by the transmission cable and the path described by the antagonist transmission cable on the respective at least a first convex ruled surface 17, 19 and on the respective second ruled surface 18. For example, if the transmission cable 15 is a transmission cable of a traction force TR, the winding pulley 14 has a greater diameter than the transverse distance P2 between the outward path 151 and the return path 152 described by the antagonist transmission cables and/or by the same transmission cable configured to act in two opposite antagonist directions.

In accordance with an embodiment, said pulley radius R14 of the winding pulley 14 is equal to the maximum dimension, or thickness, of the articulated end 10.

In accordance with a preferred embodiment, the second link 12 is moved by two transmission cables 15 of a traction action TR in antagonistic directions, and each transmission cable comprises an enlarged distal end which is received in a respective termination seat 26 of the winding pulley 14 of the second link 12.

In accordance with a preferred embodiment, the first support link 11 comprises two opposite and facing second convex ruled sliding surfaces 18, which are both facing the centerline 22 of the articulated end 10, in which the transverse distance P2 between said two opposite second surfaces 18, for example measured along the pitch axis P-P, is smaller than the diameter of the winding pulley 14 of the second link 12. Thereby, the opposite and facing second surfaces 18 each form a diverter, which allows the transmission cable 15 to divert the path thereof to wind about the winding pulley 14. In fact, the path of the transmission cable 15 is preferably straight along the articulated end 10 and substantially parallel to the longitudinal centerline X-X of the positioning shaft 21, since in the articulated end 10 there are no concave guide holes or concave guide channels for the transmission cables 15, 16, and it is diverted away from the centerline 22 by virtue of the provision of said two opposite second convex ruled sliding surfaces 18 of the first support link 11.

The provision of said enlarged winding pulley 14, i.e., protruding with respect to the second ruled surface 18 of the support link 11 allows increasing the clamping force of the degree of freedom of opening/closing G with the same traction force TR applied to the transmission cable 15. Therefore, this configuration can be advantageous when provided in combination with a cutting blade 25 provided on the second link 12 (and preferably also on the third link 13).

In accordance with an embodiment, said first support link 11 comprises at least a second surface cantilever 28 forming a free end 29, in which said second surface 18 belongs to said second cantilever 28 of the first support link 11. Preferably, the cantilever 28 extends substantially distally, i.e., toward the winding pulley 14 of the second link 12 where provided, forming a free end facing at least distally. Preferably, the cantilever 28 of the first support link 11 extends in the radial direction R-R outside the winding pulley 14 of the second link 12, with the articulated end 10 assembled. The free end 29 can also face transversally away from the centerline 22, for example along the direction of the pitch axis P-P. Preferably, in this case, said second convex ruled surface 18 in sliding contact with the transmission cable 15, 16 faces the longitudinal centerline 22 of the surgical instrument, acting as a transverse containment element of the cable, and if necessary, i.e., in the presence of a protruding winding pulley 14, acting as a diverter for the transmission cable 15, 16. The containment and diverter functions can be performed both in substantially straight articulated end 10 conditions and in bending conditions of one or more of the degrees of freedom thereof determined by the movement of the second link 12 (e.g., yaw Y-Y and opening/closing G).

The shape of the second cantilever 28 of the first support link 11 can follow the shape of the cross-section of the prongs 34, for example where the first support link 11 is made in a single piece by a wire electro-erosion process (WEDM) on two cutting planes orthogonal to each other.

The first support link 11 can be moved by including an actuation tendon 46 of degree of freedom of P-P and preferably by providing two antagonistic actuation tendons 46. Therefore, the body of the first support link 11 can comprise a termination seat 47 for receiving an operative distal end of at least one actuation tendon 46 for moving the first support link 11 with respect to the proximal link 20 about the rotation axis P-P. The termination seat 47 of the first support link 11 is preferably provided along the centerline 22 of the articulated end 10, as well as along the centerline of the first support link 11, substantially aligned with the position of the through hole 40 along the longitudinal axis X-X. The termination seat 47 can be delimited, in a direction parallel to the rotation axis P-P, between a distally directed cantilever and the root of a prong 34 of the first support link 11. To this end, the prong 34 of the first support link 11 can include a thin, i.e., narrow, root in the direction of the rotation axis Y-Y and a wider, blade-operating distal portion. In accordance with an embodiment, the thin root of the prongs 34 is also not aligned with the longitudinal centerline 22 of the first support link 11 so as to form the termination seat 47 for the actuation tendon 46 of the first support link 11 outside the body of the prong 34, avoiding structurally weakening the prong 34.

The actuation tendon 46 for the first support link 11 and the traction action transmission cable 15 of the second link 12 can be made substantially identical. For example, they can both be braided polymer cables.

The at least a first surface 17, 19 can comprise a first surface 19 provided distally with respect to the second surface 18. In accordance with a preferred embodiment, said first support link 11 comprises a cantilever 27 forming a free end, in which said at least a first surface 19 belongs to said first cantilever 27. Preferably, said at least a first surface 19 faces the longitudinal centerline 22 of the surgical instrument.

The at least a first surface 17, 19 can comprise a first surface 17 provided proximally with respect to the second surface 18. For example, said at least a first surface 17 at least partially surrounds the pitch rotation axis P-P and faces away from the pitch rotation axis P-P.

Preferably, at least one of the at least a first surface 17, 19 and the second surface 18 belongs to a bulge or protrusion of the body of the first support link 11. By virtue of the provision of said bulge, the sliding surface is configured to be cantilevered, thus limiting the length of the contact segment between the transmission cable and the convex ruled sliding surface on which it slides, thus reducing the sliding friction.

Each convex ruled sliding surface defines a contact angle $\alpha$ with the transmission cable sliding thereon.

In accordance with an embodiment, the sliding contact angle $\alpha$ between the transmission cable and at least one of said at least a first surface 17, 19 and the second surface 18 does not change in any kinematic operating configuration of the articulated end 10.

The contact angle $\alpha$ between the second surface 18 and the transmission cable 15 can be constant in each operating configuration of the articulated end 10.

The contact angle $\alpha$ between the at least a first surface 17, 19 and the transmission cable 15, 16 can vary depending on the operating configuration of the articulated end 10. For example, it can occur that in some operating configurations the transmission cable 15, 16 is not in contact with a contact surface between said at least a first surface 17, 19 and said second surface 18.

In accordance with an embodiment, the sliding contact angle $\alpha$ between the transmission cable 15, 16 and at least one of said at least a first surface 17, 19 and said second convex surface 18 is less than 90 degrees. Preferably, said contact angle $\alpha$ is less than 45 degrees. In accordance with an embodiment, the contact angle $\alpha$ is less than 30 degrees for each movement configuration.

In accordance with an embodiment, the sliding contact angle $\alpha$ between the transmission cable 15, 16 and each of said at least a first surface 17, 19 and said second convex surface 18 is less than 90 degrees. Preferably, said contact angle $\alpha$ is less than 45 degrees. In accordance with an embodiment, the contact angle $\alpha$ is less than 30 degrees for each movement configuration.

The sliding contact angle $\alpha$ between a certain convex ruled surface can vary under operating conditions depending on the kinematic configuration assumed by the link chain of the articulated end 10.

Figure 4:
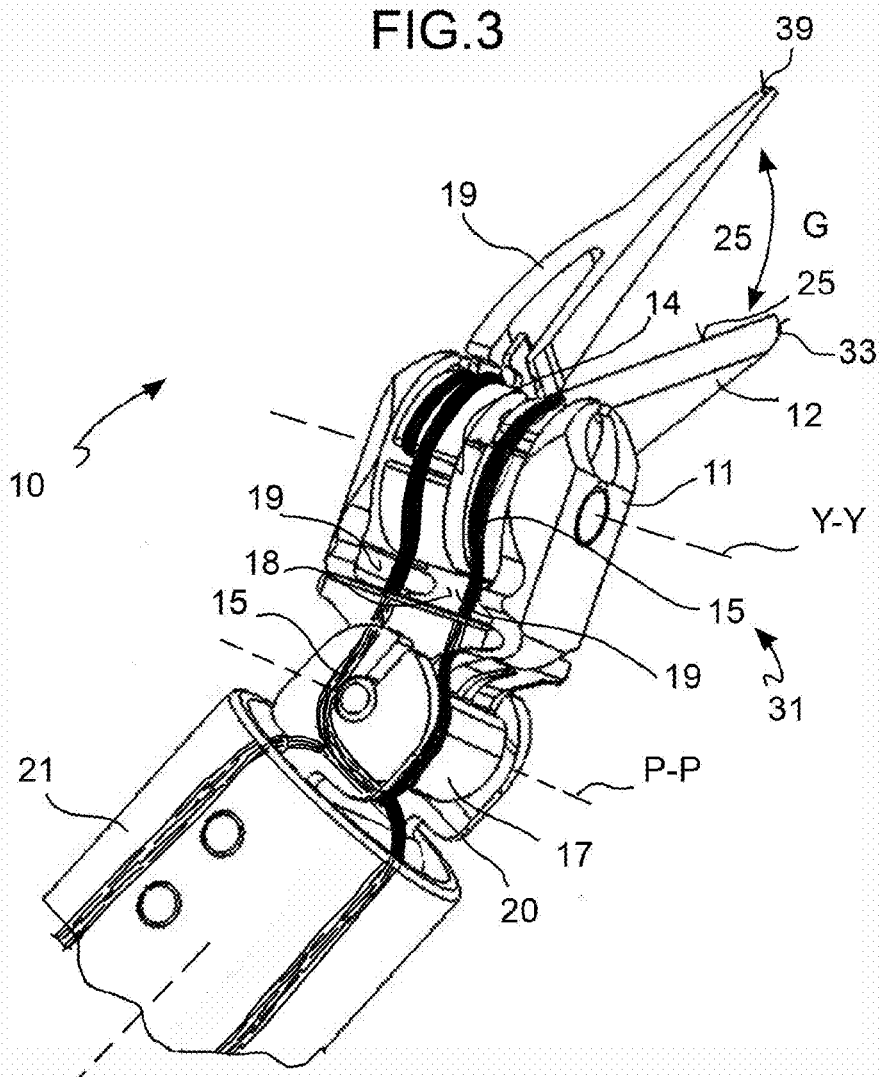
FIG. 4 is an axonometric view of a portion of a surgical instrument, according to an embodiment.
Figure 5:
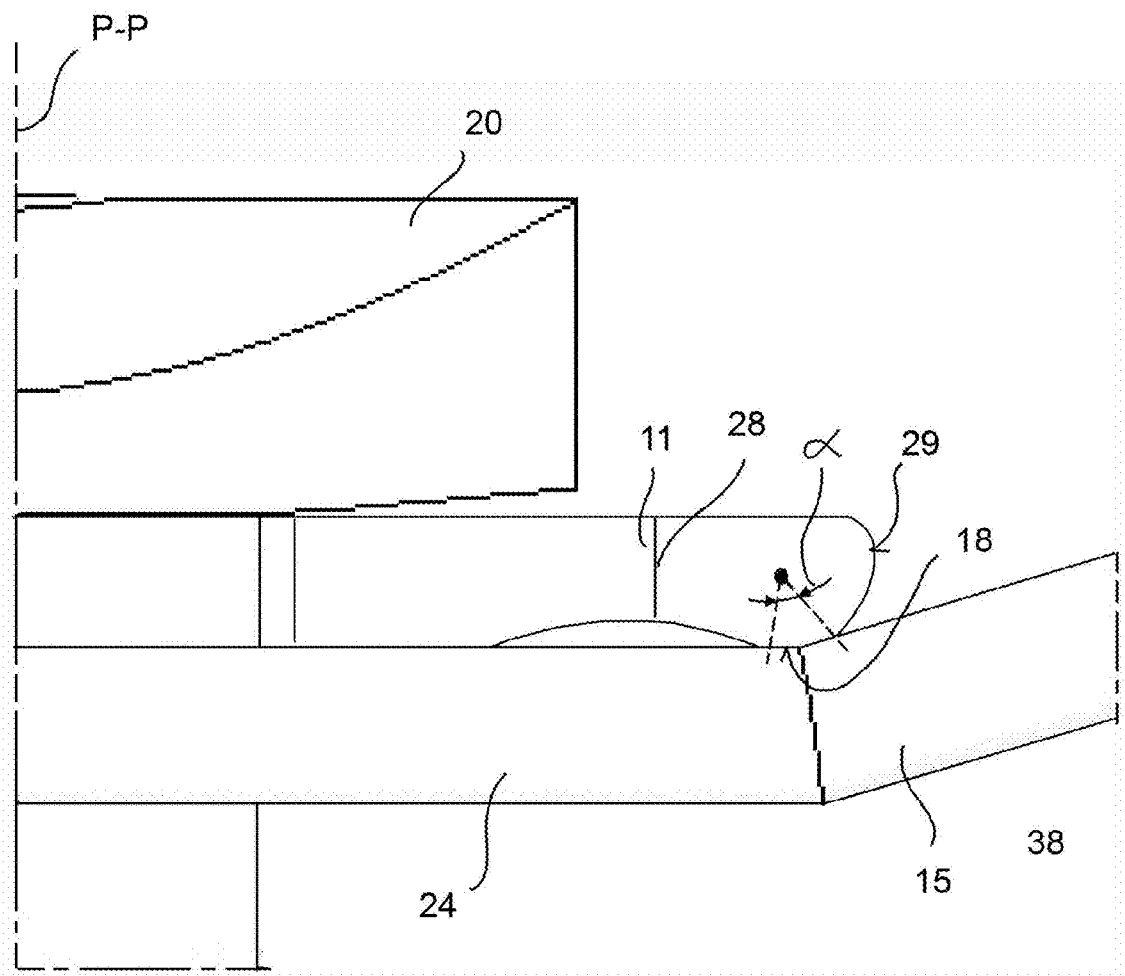
FIG. 5 is a plan view diagrammatically showing a detail of an articulated end, according to an embodiment.
Figure 6:
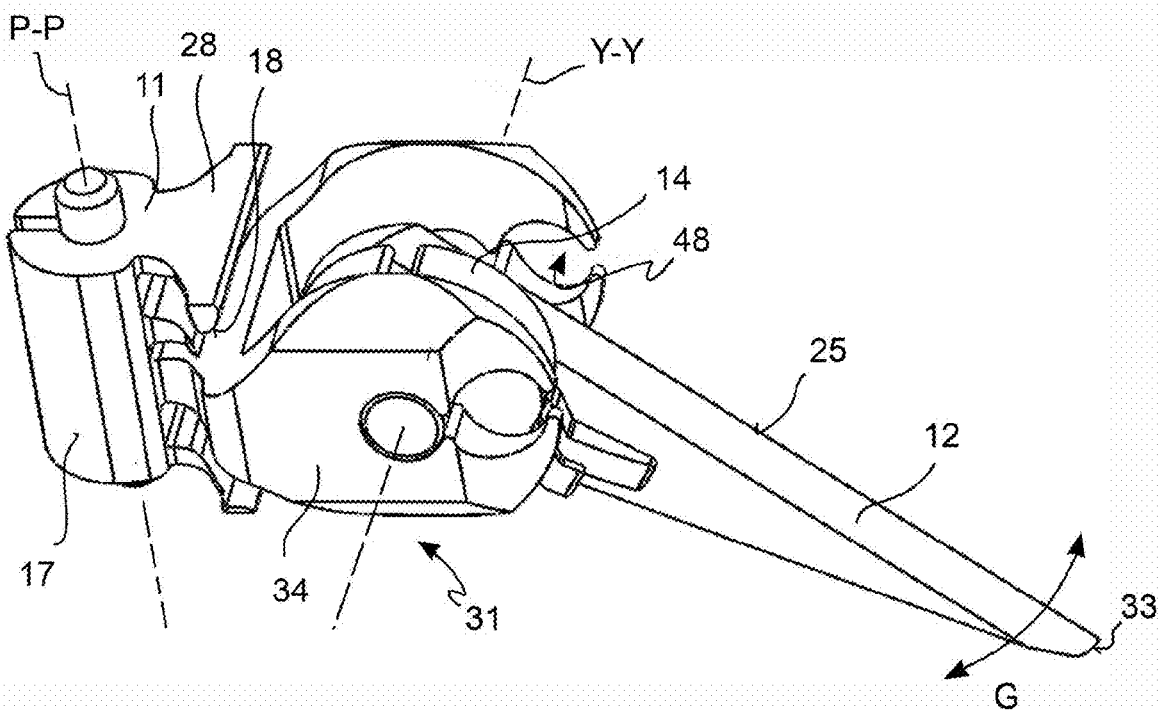
FIG. 6 is an axonometric view of an articulated end comprising two links, according to an embodiment.
Figure 7:
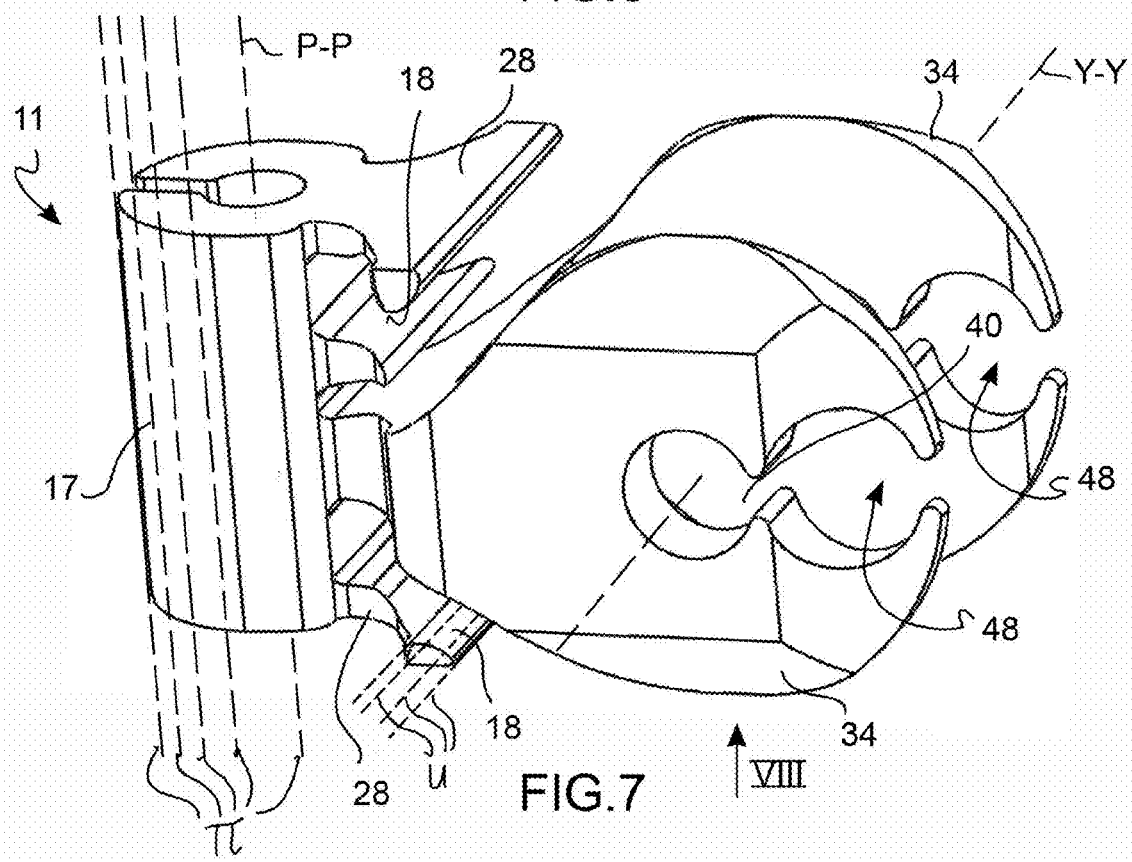
FIG. 7 is an axonometric view of a support link, according to an embodiment.
Figure 8:
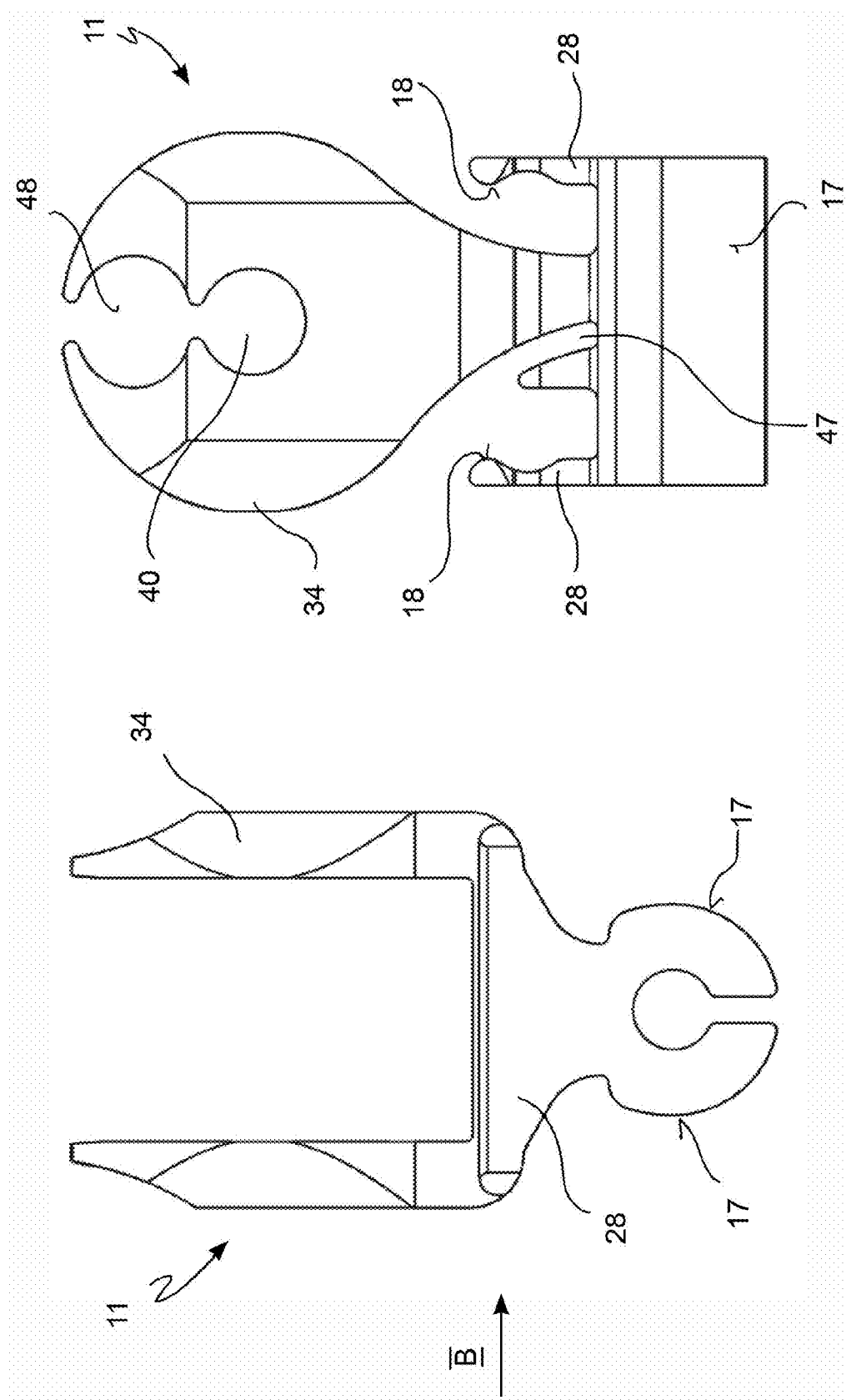
FIG. 8A is a plan view of the support link in FIG. 7 according to the viewpoint indicated with arrow VIII in FIG. 7.
FIG. 8B is a plan view of the support link in FIG. 7 according to the viewpoint indicated with arrow B in FIG. 8A.
Figure 9:
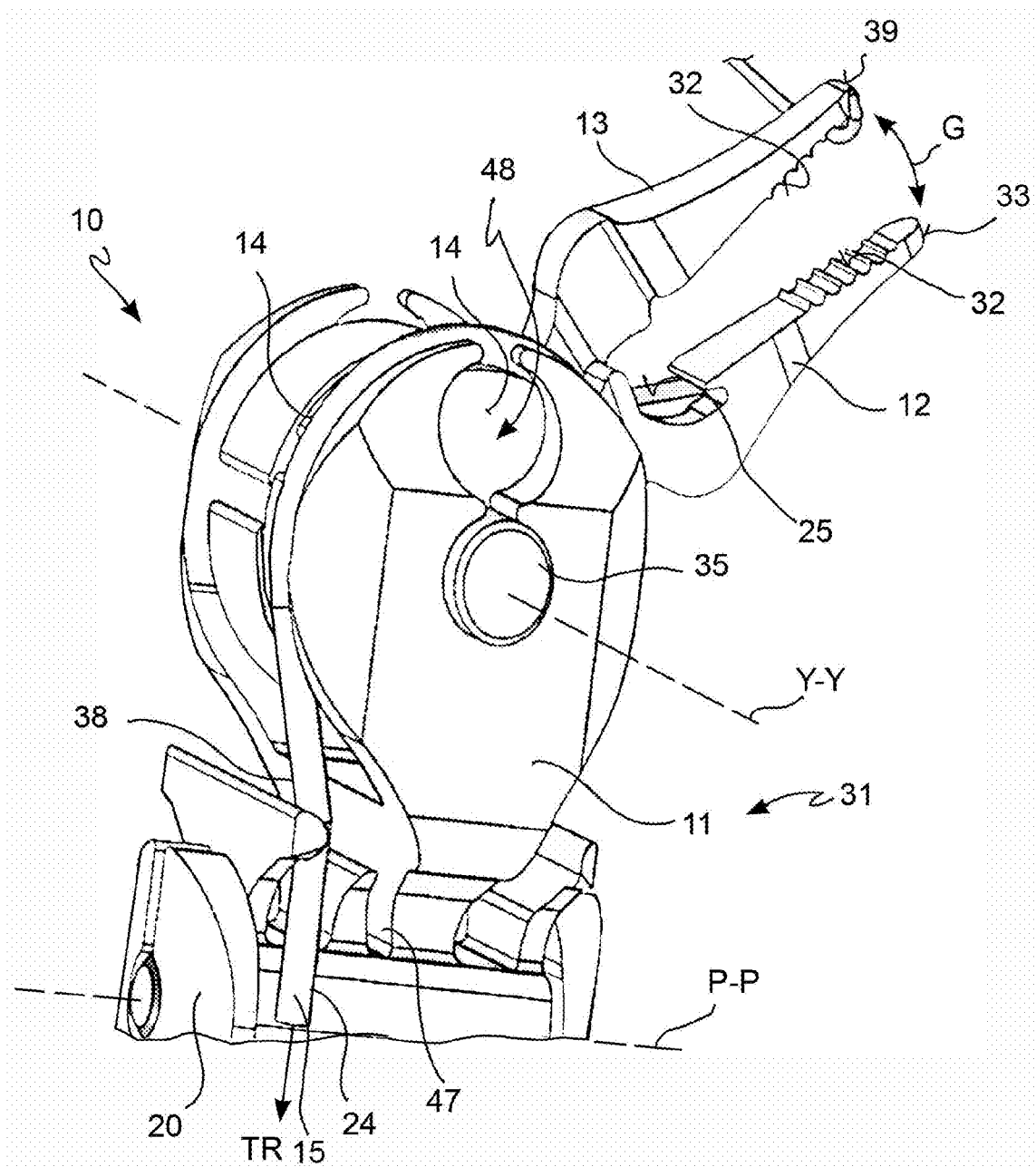
FIG. 9 is an axonometric view of an articulated end, according to an embodiment.

As shown for example in FIG. 4, the sliding contact angle of the transmission cable 15 with the first ruled surface 17 can vary when the degree of freedom of pitch is activated.

Figure 17:
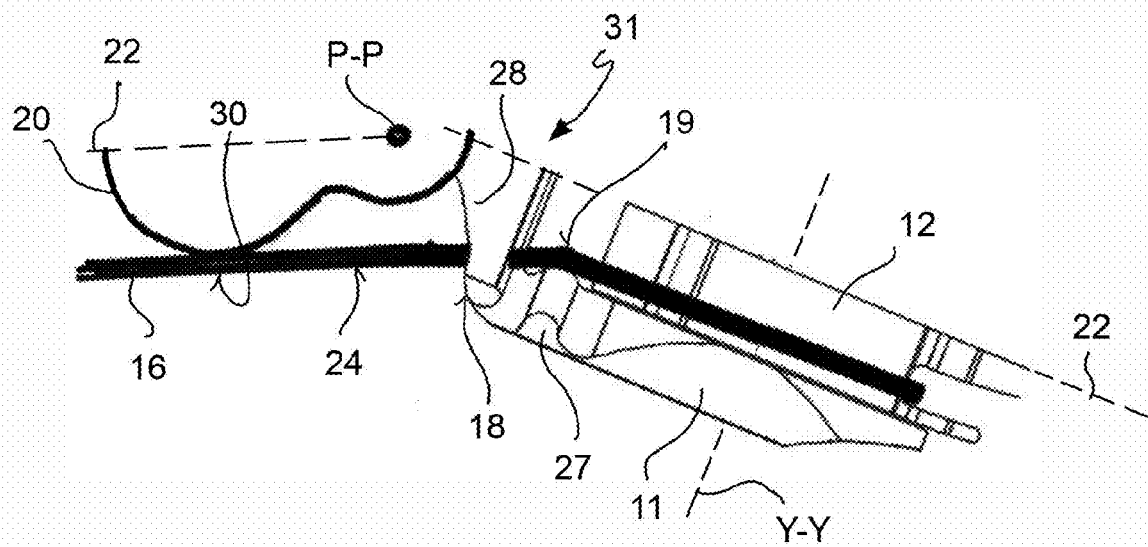
FIG. 17 is a plan view of a portion of the articulated end in FIG. 16 in a possible operating configuration.
Figure 18C:
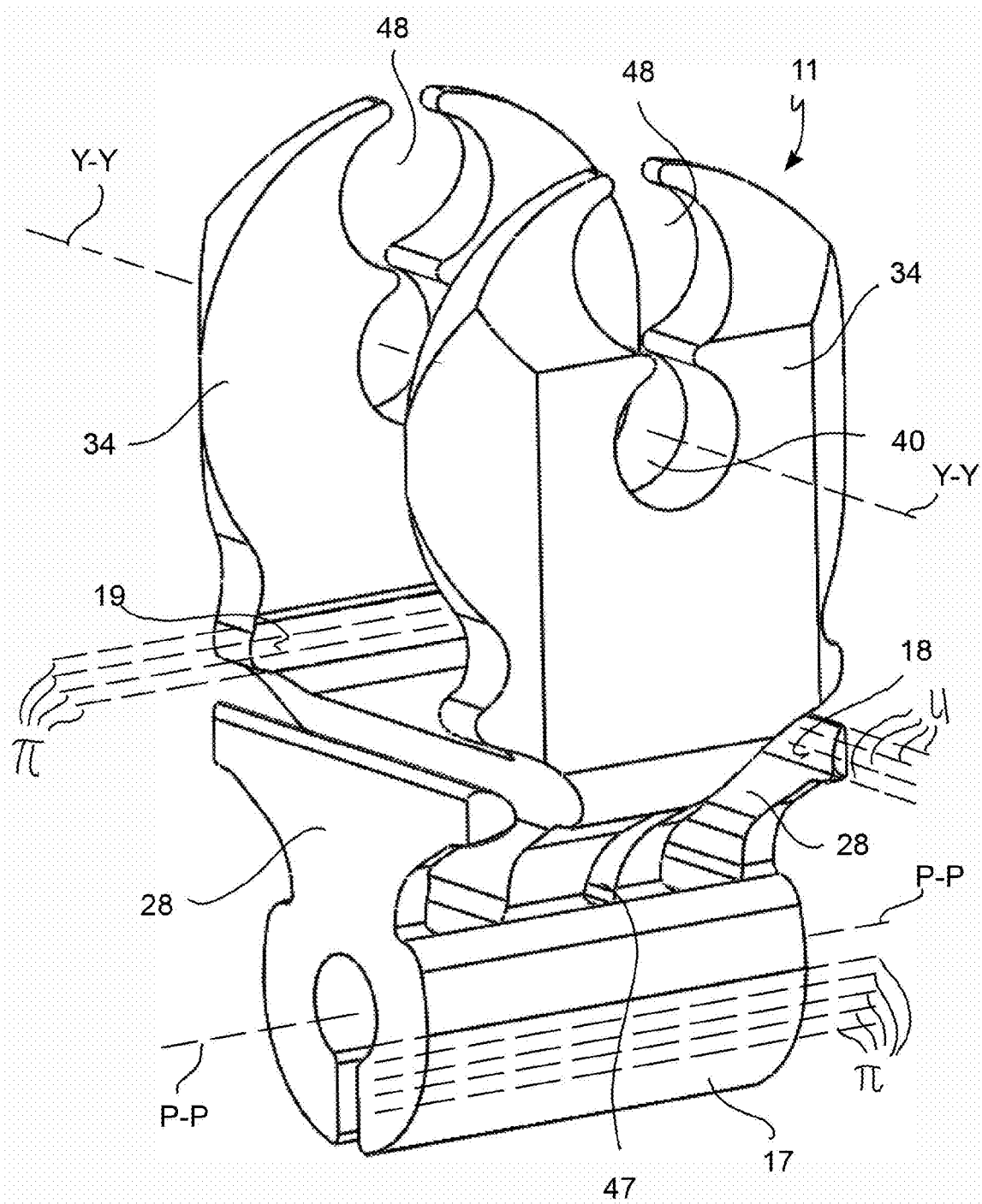
FIG. 18C is an axonometric view of the support link in FIG. 18A.
Figure 19A:
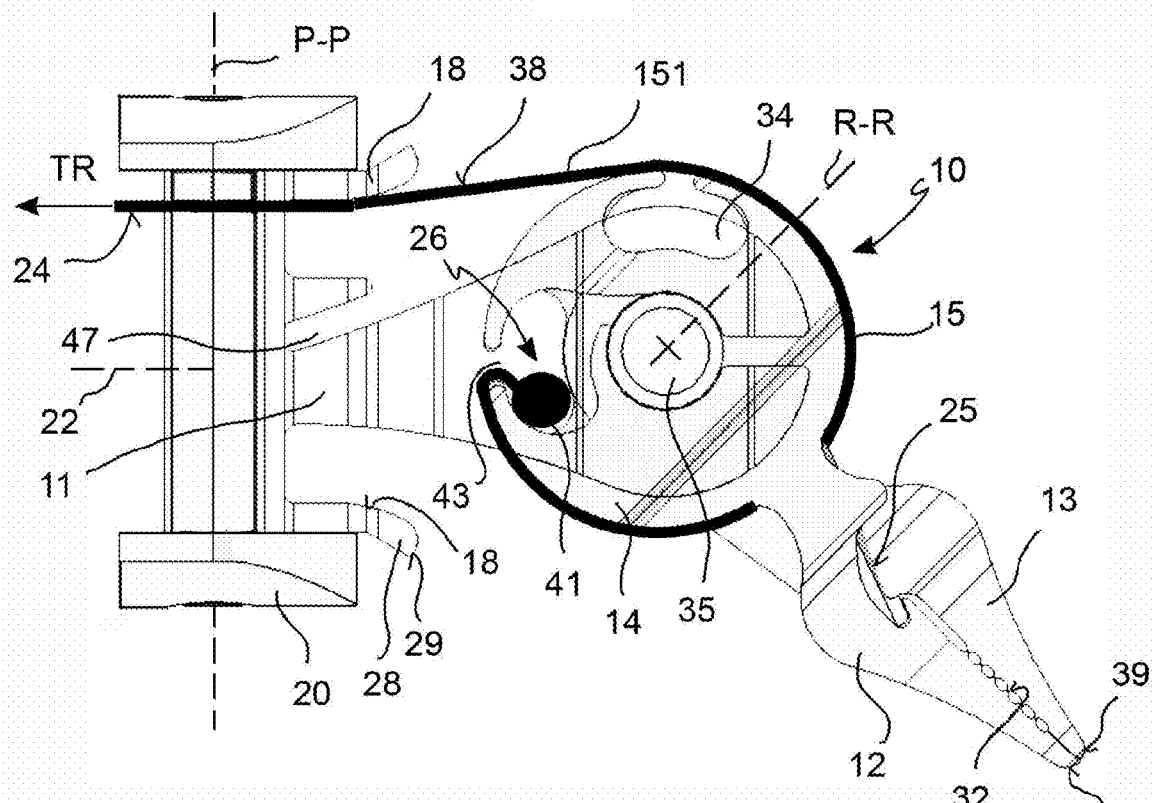
FIG. 19A is a diagrammatic plan view of a portion of an articulated end, according to an embodiment, in which some parts are transparent for clarity.
Figure 19B:
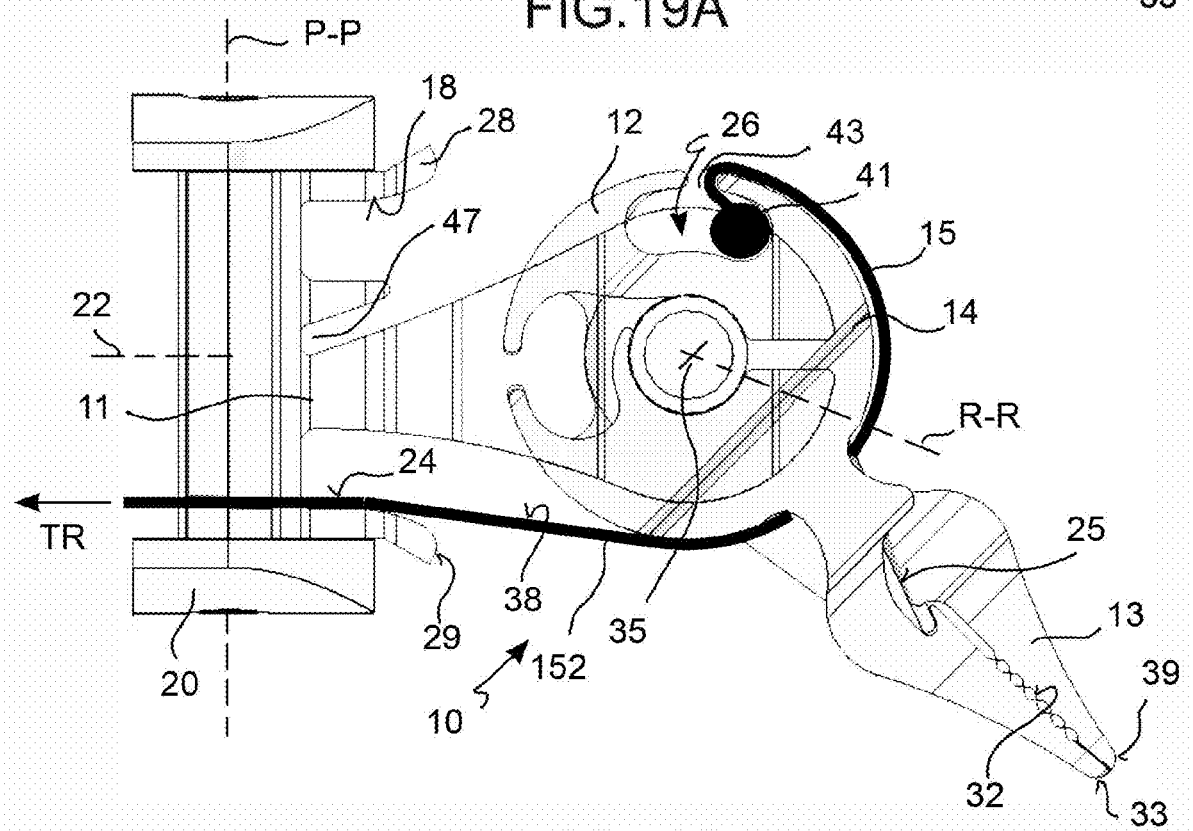
FIG. 19B is a diagrammatic plan view of a portion of the articulated end in FIG. 19A.

As shown for example in FIG. 17, the sliding contact angle of the transmission cable 15, 16 with the first ruled surface 19 varies when the degree of freedom of pitch is activated. For example, when the articulated end 10 is in an extended configuration aligned with the longitudinal axis X-X of the shaft 21, the sliding contact angle with the first ruled surface 19 is minimal, while it increases with the increasing bending of the pitch articulation. Thereby the convex ruled surface 19 can serve as a containment abutment to keep the transmission cable within the volume of the articulated end 10, avoiding the formation of loops or cable curls.

In accordance with a preferred embodiment, the sliding contact angle of the transmission cable 15, 16 with the second ruled surface 18 having generator lines parallel to the yaw rotation axis Y-Y is constant in any operating configuration of the articulated end 10.

As mentioned above, in accordance with an embodiment, the sliding contact angle $\alpha$ between the transmission cable and the at least a first surface 17, 19 varies depending on the pitch articulation configuration, and the sliding contact angle $\alpha$ between the transmission cable and the second surface 18 is constant in any configuration of the articulated end 10.

A contact angle $\alpha$ can be defined for each sliding contact surface with the same transmission cable.

In accordance with an embodiment, in each configuration of the articulated end 10, the sum (i) of the sliding contact angle $\alpha$ between the transmission cable and the at least a first convex surface 17, 19 and (ii) of the sliding contact angle $\alpha$ between the same transmission cable and said second convex surface 18 is less than 180°. It is also possible that there are two first surfaces 17 and 19 and the sum sliding contact angle is, in accordance with an embodiment, less than 180°. The sum sliding contact angle for the same transmission cable can be the sum of three or more local contact angles with respective three or more convex ruled surfaces of the articulated end 10, and in this case, in accordance with an embodiment, the sum total sliding contact angle is less than 180°.

It can also be desirable to increase the contact angle. In accordance with an embodiment, in each configuration of the articulated end 10, the sum (i) of the sliding contact angle $\alpha$ between the transmission cable and the at least a first convex surface 17, 19 and (ii) of the sliding contact angle $\alpha$ between the same transmission cable and said second convex surface 18 is greater than or equal to 180°. It is also possible that there are two first surfaces 17 and 19 and the sum sliding contact angle is, in accordance with an embodiment, greater than or equal to 180°.

The transmission cable is preferably a cable made at least partially of polymer material. For example, it is a cable coated with polymer material. For example, it is a polymer cable made of braided fibers. Polymer cables, for example made of UHMWPE, allow for a low friction as compared to cables made of other types of material.

In accordance with an embodiment, a first cable segment 24 between said at least a first surface 17, 19 and said second surface 18 extends parallel to the longitudinal centerline 22 and/or to the longitudinal axis X-X of the surgical instrument 1. Preferably, a second segment 38 of the same cable extending distally with respect to both said at least a first surface 17, 19 and said second surface 18 extends inclined with respect to the longitudinal centerline 22 and/or to the longitudinal axis X-X of the surgical instrument 1, for example inclined away from the centerline 22. Said segment 24 of the same cable can extend straight between the third convex ruled surface 30 of the proximal link 20 of the support structure 31 and the most distal between said at least a first surface 17, 19 and said second surface 18.

In accordance with a preferred embodiment, the at least a first surface 17, 19 and the second surface 18 are longitudinally spaced apart from each other. This avoids the creation of a sliding contact on two orthogonal sides of the same cross-section of tendons at the same time.

Figure 20:
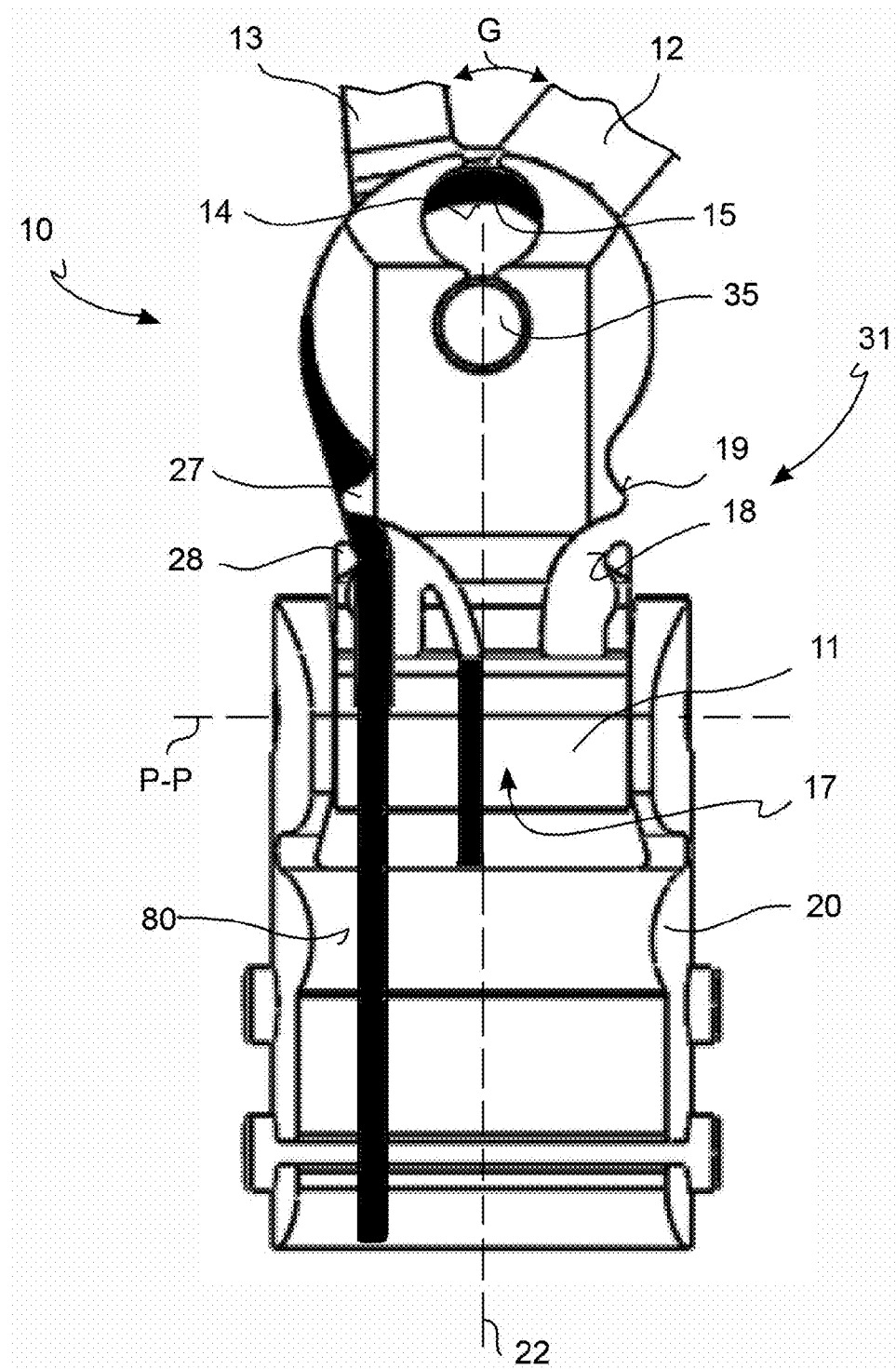
FIG. 20 is a plan view of an articulated end, according to an embodiment.

As mentioned above, in accordance with an embodiment, the first support link 11 comprises at least two longitudinally spaced first surfaces 17, 19. For example, a first surface 19 is placed on a cantilever 27 which extends cantilevered distally and the other first surface 17 is placed on a proximal portion of the first support link 11 surrounding the rotation axis P-P. The actuation tendon 46 of the first support link 11 can be wound without sliding on the first proximal surface 17 of the first support link 11, while the transmission cable 15 of the traction action TR is in longitudinal sliding contact on the same first proximal surface 17 of the first support link 11, as shown for example in FIG. 20.

A longitudinal space can be provided between the proximal link 20 and the first convex ruled surface 17 of the first support link 11 in which the antagonist transmission cables 151, 152 of a traction action TR to the second link 12 and/or the antagonist actuation tendons 46 of the first support link 11 cross each other (each with the antagonist thereof).

In accordance with an embodiment, a first surface 17, 19 of the support structure 31 is also intended as the third surface 30 of the proximal link 20. Therefore, said at least two first surfaces of the support structure 31 can comprise at least two between: said first surfaces 17, 19 of the first support link 11 and said third surface 30 of the proximal link 20. The transmission cable 15, 16 can be configured to slide over all of the at least two first surfaces. At least three convex ruled surfaces 17, 18, 19, 30 including said second surface 18 can be provided on the support structure 31, and said transmission cable 15, 16 is configured to slide on all three of said at least three ruled surfaces. Said at least three convex ruled surfaces are preferably longitudinally spaced apart from each other.

By longitudinally spacing the convex ruled sliding surfaces for the transmission cable from each other, a single cross-section of the transmission cable is prevented from sliding, i.e., being in sliding/rubbing contact with the links on two sides. This allows maximizing the service life of the transmission cable 15, 16 because the stresses due to the sliding friction are distributed longitudinally. In other words, a certain cross-section of the transmission cable 15, 16 touches only a small part of the outer surface of the links of the articulated end 10 avoiding that the same certain cross-section touches on two separate parts.

A manufacturing method by wire electro-erosion of at least a portion of the articulated end 10 according to any one of the above-described embodiments will now be described.

Figure 22A:
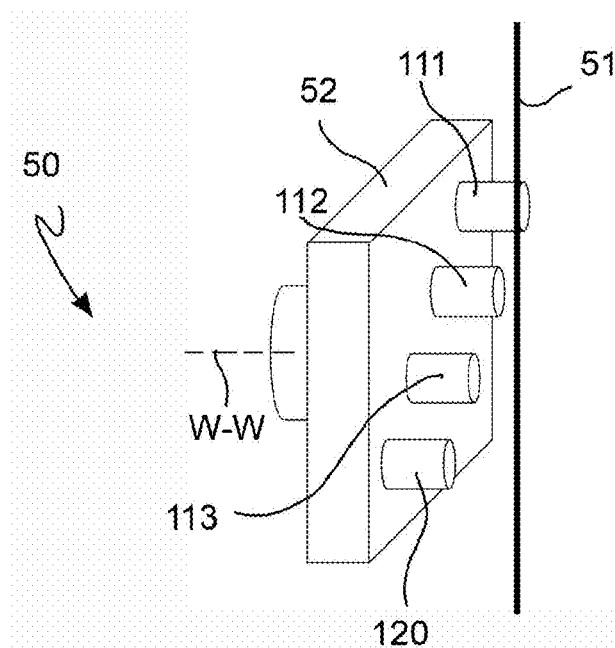
FIGS. 22A and 22B show some possible steps of a manufacturing method by wire electro-erosion, according to an embodiment.
Figure 22B:
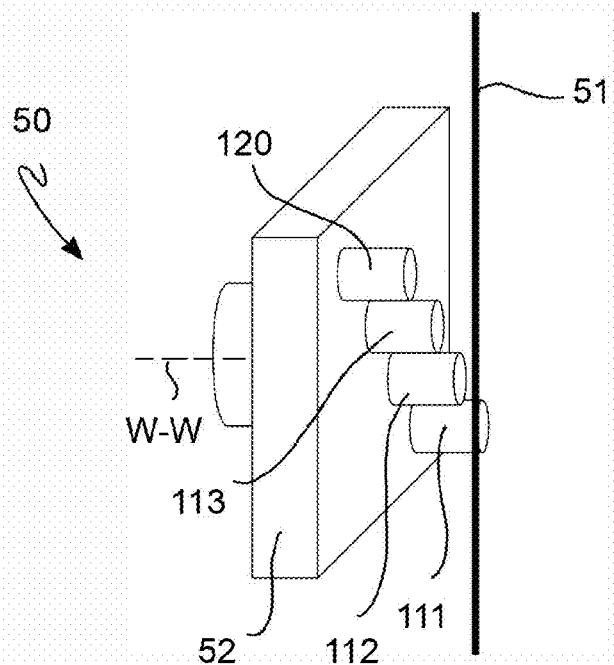

In accordance with a general embodiment, a manufacturing method by wire electro-erosion of at least one support link 11 of an articulated end 10 comprises:
  providing a wire electro-erosion machine 50 having a cutting wire 51; a diagram of a wire electro-erosion machine 50 is illustrated in FIG. 22A-B;
  mounting at least one workpiece 111, 112, 113, 120 to the wire electro-erosion machine, for example by using a specific tooling 52 provided with one or more seats to receive one or more respective workpieces 111, 112, 113, 120;
  making with the cutting wire 51 of the wire electro-erosion machine a first through cut on the at least one workpiece;
  rotating the at least one workpiece by 90° with respect to the cutting wire, preferably by rotating the tooling 52 without disassembling the tooling from the machine 50 or the workpieces from the tooling; and
  making with the cutting wire 51 of the wire electro-erosion machine a second through cut on the same at least one workpiece 111, 112, 113, 120.

By virtue of such a method, it is possible to make a support link 11 having at least two sliding surfaces 17, 18, 19 formed by respective two sweeping motions of the cutting wire 51. Therefore, the cutting wire acts as the straight generator lines of the convex ruled surfaces 17, 18, 19.

Preferably, at least one through cut between said first and second through cuts makes at least one hole adapted to receive an articulation pin. Therefore, the walls of the hole are made parallel to at least one sliding surface and at the same time orthogonal to the other.

The method can be used to also make at least one of (but also all of): the second link 12 with the winding pulley 14, the third link 13, the proximal link 20. In accordance with a possible operating mode, a plurality of workpieces are mounted on the tooling, for example four workpieces 111, 112, 113, 120, which are arranged so that the cutting wire 51 intersects at most one at a time both during the first through cut and during the second through cut (this can determine the rotation angle of the rotating step), thus making four different links, and for example said support link 11, second link 12, third link 13 and proximal link 20. Thus, with a single assembly of the workpieces to the wire electro-erosion machine 50 it is possible to make all the links of the articulated end 10 of the surgical instrument 1.

In accordance with a possible operating mode, the links are shaped by means of said first and second through cuts on planes orthogonal to each other.

In accordance with a possible operating mode, the cutting wire 51 makes a greater number of sweeping motions on the portions of the workpieces which will form said at least first and second convex ruled sliding surfaces with straight generator lines orthogonal to each other, as compared to the number of sweeping motions employed to shape other parts of the links, such as the prong portions of the first support link and/or the through holes for receiving respective articulation pins.

A method of assembling a surgical instrument 1 will be described below.

A method of assembling a surgical instrument 1 comprises the following steps of:
  inserting an articulation pin 35 into through holes of a first support link 11 and of a second link 12, and preferably also of a third link 13;

fixing an operative distal end 41 of the transmission cable 15 of a traction action TR in a termination seat 26 provided in the body of the winding pulley 14 of the second link 12; and winding a distal portion, adjacent to the operative distal end 41 of the transmission cable 15, on the surface of the winding pulley 14.

In accordance with a possible operating mode, the steps of inserting, fixing and winding are carried out in sequence, in this order: first the insertion step is performed, then the fixing step and then the winding step.

In accordance with a preferred operating mode, the step of fixing the operative distal end 41 of the transmission cable 15 comprises the following further steps of:

making a configuration of through axial alignment (being axial with respect to the rotation axis Y-Y of the second link 12) between the termination seat 26 of the winding pulley 14 of the second link 12 and an assemblage window 48 of the prong 34 of the first support link 11;

axially inserting the operative distal end 41 of the transmission cable 15, which for example comprises an enlarged portion, into the assemblage window 48 of the prong 34 of the first support link 11 and then into the termination seat 26 of the winding pulley 14 of the second link 12, axially aligned thereto.

The step of making a through axial alignment configuration can comprise rotating the winding pulley 14 of the second link 12 about the rotation axis Y-Y defined by the articulation pin 35.

In accordance with a possible operating mode, the step of inserting an articulation pin, first includes fixing the rotation pin 35 in the through hole 36 of the second link 12, to make the articulation pin 35 and the winding pulley 14 of the second link 12 rotationally integral with each other. This step can be performed by elastically clamping the articulation pin 35 to the through hole 36 of the second link 12 by means of a tab 37. Alternatively, or in addition, the articulation pin 35 can be keyed to the through hole 36 of the second link 12.

In accordance with a possible operating mode, the steps of inserting, fixing and winding are carried out in sequence, in this order: first the fixing step is performed, then the winding step and then the insertion step.

The method can further comprise the step of arranging the transmission cable 15 in contact with said at least a first and second sliding surfaces 17, 18, 19 of the support structure 31.

The method can further comprise the step of arranging the transmission cable 15 along the positioning shaft of the surgical instrument 1, fixing it to a proximal transmission interface portion of the surgical instrument 1.

The method can be repeated a plurality of times, for a respective plurality of transmission cables 15 to be assembled to the second link 12 and/or to the third link 13.

The assembly method can be employed to assemble a surgical instrument 1 according to any one of the embodiments described above.

By virtue of the features described above, provided in mutual combination or not in particular embodiments, it is possible to meet to the aforementioned needs, thus achieving the aforementioned advantages, and in particular:

it is possible to guide and/or divert the transmission cables without providing holes or guide channels, but in contrast using sliding abutments formed by convex ruled surfaces with generator lines having a particular direction;

in particular, making at least two sliding abutments which are formed by ruled surfaces having generator lines orthogonal to each other, as explained above, it is possible to obtain an improved control over the trajectory of the transmission cable;

it is possible to have an increased closing force of an opening/closing articulation of an articulated end because it is possible to make a larger winding pulley without enlarging the size of the articulated end and providing abutments adapted to guide the sliding of the tendons;

between such sliding surfaces and the transmission cable, a relative movement occurs along the longitudinal axis of the transmission cable, generating sliding frictional forces, and preventing the transmission cable from driving, or being driven in rotation by, any of said sliding surfaces;

the termination seat of the support link for the actuation tendon thereof can be slightly offset with respect to the centerline;

the articulation pin can be rotationally integral with the blade of the second link, where provided;

the second link of the articulated end can be an end link forming a free end or it can be an intermediate link which is also articulated distally to a further distal link;

there is provided a robust surgical instrument which is also suitable for an extreme miniaturization of the articulated end thereof.

It is well understood that the combinations of features of the appended claims form an integral part of the present description.

In order to meet specific, contingent needs, those skilled in the art can make several changes and adaptations to the above-described embodiments and can replace elements with others which are functionally equivalent, without departing from the scope of protection as described and claimed herein.

LIST OF REFERENCE SIGNS

1 Surgical or microsurgical instrument
2 Robotic assembly for medical or surgical or microsurgical teleoperation
10 Articulated end of the surgical Instrument
11 First support link
12 Second link
13 Third link
14 Winding pulley
15 Traction action transmission cable
16 Electric power transmission cable
17 First sliding surface of the support link, or first convex ruled surface
18 Second sliding surface of the support link, or second convex ruled surface
19 First sliding surface of the support link, or first convex ruled surface
20 Further proximal link
21 Positioning rod or shaft of the surgical instrument
22 Centerline of the instrument
23 Proximal transmission interface portion of the surgical instrument
24 Tendon segment
25 Blade or cutting edge
26 Termination seat of the second link
27 Cantilever of the first surface
28 Cantilever of the second surface
29 Free end 30 Third convex ruled sliding surface
31 Support structure of the articulated end
32 Gripping surface
33 Distal free end of the second link
34 Prong
35 Articulation pin
36 Hole for the pin
37 Elastically deformable wall
38 Inclined segment of the transmission cable
39 Terminal end of the third link
40 Through hole of the support link prong
41 Distal end of the transmission cable
42 Undercut wall of the termination seat
43 Radial mouth or inlet of the termination seat
44 Circumferential protuberance of the termination seat
45 Contact surface
46 Actuation tendon of the first support link
47 Termination seat of the first support link
48 Assemblage window of the support link prong
50 Wire electro-erosion machine
51 Cutting wire
52 Tooling
111 First workpiece
112 Second workpiece
113 Third workpiece
120 Further workpiece
151 Outbound path of the cable
152 Return path of the cable
R14 Pulley radius
P1, P2 Transverse distance
P-P Pitch axis
Y-Y Yaw axis
G Degree of freedom of opening/closing
X-X Longitudinal axis of the instrument
α Sliding contact angle
π Generator line of the first ruled surface
υ Generator line of the second ruled surface
R-R Radial direction of the winding pulley of the second link
TR Traction action
W-W Rotation axis of the wire electro-erosion machine tooling

The invention claimed is:

1. A surgical instrument comprising an articulated end comprising:
a first support link,
a second link articulated with respect to the first support link about a rotation axis, and
a transmission cable fixed to the second link,
wherein the first support link comprises:
at least one first convex sliding surface, which is a ruled surface, with straight generator lines all parallel to each other,
a second convex sliding surface, which is a ruled surface, with straight generator lines all parallel to each other,
and wherein
the transmission cable is configured for sliding on both said at least one first convex sliding surface and said second convex sliding surface of the first support link when the second link rotates with respect to the first support link, and
the straight generator lines of the at least one first convex sliding surface are orthogonal to the straight generator lines of the second convex sliding surface.

2. The surgical instrument of claim 1, wherein:
the second link comprises a winding pulley,
the transmission cable is wound around said winding pulley of the second link, and
the winding pulley has radius greater than or equal to a distance between the at least one first convex sliding surface or the second convex sliding surface and a centerline of the surgical instrument.

3. The surgical instrument of claim 1, wherein:
the second link comprises a winding pulley,
the transmission cable is wound around said winding pulley of the second link, and
the winding pulley protrudes transversally with respect to the second convex sliding surface of the first support link.

4. The surgical instrument of claim 1, wherein the second convex sliding surface is parallel to the rotation axis between the second link and the first support link.

5. The surgical instrument of claim 1, wherein the straight generator lines of the at least one first convex sliding surface and the straight generator lines of the second convex sliding surface are all orthogonal to a longitudinal axis of the surgical instrument.

6. The surgical instrument of claim 1, wherein the straight generator lines of the at least one first convex sliding surface and the straight generator lines of the second convex sliding surface are all orthogonal to a longitudinal axis of a positioning shaft of the surgical instrument along which the transmission cable extends.

7. The surgical instrument of claim 1, wherein at least one of the at least one first convex sliding surface and the second convex sliding surface faces towards a definable longitudinal centerline of the articulated end, for example a longitudinal centerline of a positioning shaft of the surgical instrument along which the transmission cable extends.

8. The surgical instrument of claim 1, wherein said first support link comprises at least one cantilever forming a free end, and wherein at least one of said at least one first convex sliding surface and said second convex sliding surface belongs to said at least one cantilever of the first support link.

9. The surgical instrument of claim 1, wherein a sliding contact angle between the transmission cable and at least one of said at least one first convex sliding surface and said second convex sliding surface does not change for any operative configurations of the articulated end.

10. The surgical instrument of claim 1, wherein a sliding contact angle between the transmission cable and at least one of said at least one first convex sliding surface and said second convex sliding surface is less than 90 degrees for any operative configurations of the articulated end.

11. The surgical instrument of claim 1, wherein a sliding contact angle between the transmission cable and at least one of said at least one first convex sliding surface and said second convex sliding surface is less than 45 degrees for any operative configurations of the articulated end.

12. The surgical instrument of claim 1, wherein a sliding contact angle between the transmission cable and at least one of said at least one first convex sliding surface and said second convex sliding surface is less than 30 degrees for any operative configurations of the articulated end.

13. The surgical instrument of claim 1, wherein:
for any operative configurations of the articulated end, a sum of a sliding contact angle between the transmission cable and the at least one first convex sliding surface with the sliding contact angle between a same transmission cable and the second convex sliding surface is less than 180 degrees; and/or wherein in at least one operative configuration of the articulated end, the sum of the sliding contact angle between the transmission cable and the at least one first convex sliding surface with the sliding contact angle between the same transmission cable and the second convex sliding surface is greater than or equal to 180 degrees.

14. The surgical instrument of claim 1, wherein the at least one first convex sliding surface and the second convex sliding surface are longitudinally spaced apart.

15. The surgical instrument of claim 1, wherein the first support link is made as a single piece.

16. The surgical instrument of claim 1, wherein:
the articulated end further comprises a proximal link, which is articulated proximally to the first support link to rotate about a common rotation axis;
said proximal link comprises a third convex sliding surface for sliding of the transmission cable; and
the third convex sliding surface is a ruled surface having straight generator lines all parallel to either the straight generator lines of the at least one first convex sliding surface or the straight generator lines of the second convex sliding surface.

17. The surgical instrument of claim 1, wherein the transmission cable comprises an operative distal end to drag the second link which is housed in a termination seat made within a discoidal encumbrance of a winding pulley, and wherein the transmission cable is at least partially made of polymer fibers.

18. The surgical instrument of claim 1, further comprising an articulation pin extending along the rotation axis, the second link being articulated with respect to the first support link by said articulation pin, wherein the articulation pin is integral in rotation with a winding pulley of the second link.

19. A method for assembling a surgical instrument comprising an articulated end comprising:
a first support link,
a second link articulated with respect to the first support link about a rotation axis,
a transmission cable fixed to the second link,
wherein the first support link comprises:
at least one first convex sliding surface, which is a ruled surface, with straight generator lines all parallel to each other,
a second convex sliding surface, which is a ruled surface, with straight generator lines all parallel to each other,
and wherein:
the transmission cable is configured for sliding on both said at least one first convex sliding surface and said second convex sliding surface of the first support link when the second link rotates with respect to the first support link, and
the straight generator lines of the at least one first convex sliding surface are orthogonal to the straight generator lines of the second convex sliding surface, the method comprising:
inserting an articulation pin in through holes of the first support link and the second link;
fixing an operative distal end of the transmission cable in a termination seat made within the winding pulley of the second link;
winding a distal section, which is adjacent to said operative distal end, of the transmission cable to the winding pulley;
wherein fixing the operative distal end of the transmission cable in the termination seat comprises:
arranging a configuration of through axial alignment between the termination seat of the winding pulley of the second link and an assemblage window of the first support link, and
axially inserting the operative distal end of the transmission cable in the assemblage window of the first support link and in the termination seat of the winding pulley of the second link.

* * * * *